(12) United States Patent
Dolev et al.

(10) Patent No.: US 11,233,637 B2
(45) Date of Patent: Jan. 25, 2022

(54) SYSTEM AND METHOD FOR VALIDATING AN ENTITY

(71) Applicant: SECRET DOUBLE OCTOPUS LTD, Tel-Aviv (IL)

(72) Inventors: Shlomi Dolev, Omer (IL); Lior Shiponi, Hod Hasharon (IL)

(73) Assignee: SECRET DOUBLE OCTOPUS LTD, Tel Aviv (IL)

( * ) Notice: Subject to any disclaimer, the term of this patent is extended or adjusted under 35 U.S.C. 154(b) by 343 days.

(21) Appl. No.: 16/163,583

(22) Filed: Oct. 18, 2018

(65) Prior Publication Data
US 2020/0127821 A1 Apr. 23, 2020

(51) Int. Cl.
*H04L 9/08* (2006.01)
*H04L 29/06* (2006.01)
*G06F 21/60* (2013.01)

(52) U.S. Cl.
CPC .......... *H04L 9/0847* (2013.01); *G06F 21/602* (2013.01); *H04L 9/0861* (2013.01); *H04L 63/0435* (2013.01); *H04L 63/0442* (2013.01); *H04L 63/18* (2013.01)

(58) Field of Classification Search
CPC combination set(s) only.
See application file for complete search history.

(56) References Cited

U.S. PATENT DOCUMENTS

| | | |
|---|---|---|
| 7,886,334 B1 | 2/2011 | Walsh et al. |
| 8,539,603 B2 | 9/2013 | Hauser |
| 2003/0048906 A1* | 3/2003 | Vora .................. G06Q 20/02 380/277 |
| 2005/0271207 A1* | 12/2005 | Frey .................. H04L 9/0668 380/263 |
| 2008/0235513 A1 | 9/2008 | Foster et al. |
| 2009/0015876 A1* | 1/2009 | Brown ............... H04N 1/32112 358/405 |
| 2009/0024853 A1* | 1/2009 | Yeap .................. H04L 9/083 713/182 |
| 2012/0311666 A1 | 12/2012 | Wouhaybi et al. |
| 2012/0331536 A1 | 12/2012 | Chabbewal et al. |
| 2013/0204398 A1 | 8/2013 | Minamizawa |

(Continued)

FOREIGN PATENT DOCUMENTS

WO WO 2015/035396 3/2015

OTHER PUBLICATIONS

International Search Report of Application No. PCT/IL2017/050255 dated Jun. 27, 2017.

(Continued)

*Primary Examiner* — Khoi V Le
(74) *Attorney, Agent, or Firm* — Pearl Cohen Zedek Latzer Baratz LLP

(57) ABSTRACT

A system and method for validating an entity and sending secret shared public key for securely communicating data that may include providing first and second entities with an identical sequence of bits; encrypting data, by the first entity, using bits in a first portion of the identical sequence as an encryption key, to produce encrypted data; XORing the encrypted data based on bits in a second portion of the sequence to produce encrypted and XORed data; sending the encrypted and XORed data to the second entity; and using the sequence of bits, by the second entity, to un-XOR and decrypt the encrypted and XORed data.

18 Claims, 7 Drawing Sheets

(56) References Cited

U.S. PATENT DOCUMENTS

| | | |
|---|---|---|
| 2014/0013390 A1 | 1/2014 | Sade et al. |
| 2014/0237570 A1 | 8/2014 | Shishkov et al. |
| 2015/0215348 A1 | 7/2015 | Koeten |
| 2016/0350544 A1* | 12/2016 | Wong .................... H04L 9/0891 |
| 2017/0012778 A1* | 1/2017 | Choyi ................... H04L 63/126 |

OTHER PUBLICATIONS

Office Action from the USPTO for U.S Application publication No. 2019/008971-A1 dated Aug. 7, 2020.
Office Action for U.S. Appl. No. 16/080,014 dated Apr. 5, 2021.

* cited by examiner

SYSTEM AND METHOD FOR VALIDATING AN ENTITY

FIELD OF THE INVENTION

The present invention relates generally to security and authentication. More specifically, the present invention relates to establishing trust between entities and establishing a secured communication channel between parties.

BACKGROUND OF THE INVENTION

Protecting and securing information communicated between computing devices is a requirement that is well-acknowledged by the computing industry. As known in the art, an attacker that gains access to sensitive or personal data may cause extreme damage. The need to authenticate devices is critical in enforcing security of information. In addition, establishing trust between entities is another requirement that is well-acknowledged by the computing industry. As known in the art, an attacker that impersonates an entity or user may cause extreme damage, and the need to validate, authenticate or verify the identity of a party to a communication is, therefore, critical for the industry.

Known systems and methods use encryption to secure and protect communicated data and credentials (e.g., user name and password) to authenticate devices or users. However, known systems and methods suffer from a few drawbacks. For example, some systems and methods use a certificate authority that, if hacked, may fail to provide security. Other examples may be a hacker who obtains credentials such as user name and password and can use the credentials to authenticate himself to a computer, device or system, an eavesdropper who manages to obtain an encryption key can decrypt encrypted data, and an adversary or malicious entity who manages to capture one or more decrypted messages may decipher the encrypted messages.

For example, some known systems and methods use a public key infrastructure (PKI) that includes a set of roles and procedures used to create and distribute digital certificates that are used to authenticate, or confirm identities of, parties involved in a communication. Specifically, a third party, e.g., a registration authority (RA) or certification authority (CA) accepts requests for digital certificates and authenticates entities.

Accordingly, CA, RA and/or PKI based systems and methods do not scale easily since the load on an RA increases as the number of devices in a system grows. This is drawback of known systems and methods since, for example, current Internet usage including ecommerce and financial activities requires authentication of a great number of entities. For example, known systems and methods are unable to meet challenges introduced by the introduction of Internet of Things (IoT) devices and systems where extremely large numbers of devices need to be authenticated.

Yet another drawback is the fact that, if a key issued by an RA and used for signing certificates is stolen or otherwise obtained by a hacker, then all certificates of the RA are immediately rendered useless. Further aggravating the problem associated with known systems and methods is the fact that RAs or CAs are a single point of failure. Yet another drawback of known systems and methods such as PKI based systems is that they do not enable two devices to authenticate each other without using a third device, party or entity, for example, in a PKI based system, for two devices to authenticate each other, a third entity (e.g., an RA) must be used.

SUMMARY OF THE INVENTION

An embodiment for validating an entity may include providing, by a first entity to a second entity, two or more shares including respective two or more portions of a public key over a respective two or more communication channels; reconstructing and using the public key, by the second entity, to encrypt at least one of: data generated based on information included in the shares, and possibly predefined data, providing the encrypted data to the first entity; and validating the second entity, by the first entity, based on matching the encrypted data with an expected data. A subset of the shares may be enough for reconstructing the public key.

Reconstructing the public key may be done based on the largest subset of the shares that produces the same public key. The roles of the first and second entities may be reversed. The first entity may repeatedly validate the second entity using different public keys.

Providing the sequence of bits may include producing a random sequence of bits; using the public key to generate a symmetric key; encrypting the random sequence of bits using the symmetric key to produce an encrypted sequence of bits; providing the encrypted sequence of bits to at least one of the first and second entities; and producing the identical sequence of bits, by the at least one of the first and second entities, by decrypting the encrypted sequence of bits. Encryption may be performed using a quantum safe crypto system or method.

An embodiment may include providing the first and second entities with an identical sequence of bits; encrypting data, by the first entity, using bits in a first portion of the sequence as an encryption key, to produce encrypted data; XORing the encrypted data based on bits in a second portion of the sequence to produce encrypted and XORed data; sending the encrypted and XORed data to the second entity; and using the sequence of bits, by the second entity, to un-XOR and decrypt the encrypted and XORed data. The first entity may be validated, by the second entity, based on matching the received data with data in the sequence of bits.

The sequence of bits may be provided on a hardware storage system that enables an operation selected from the group consisting of: XORing data, encrypting data and decrypting data, based on portions of the sequence; wherein the hardware storage system prevents reading/writing data from/to the hardware storage system. The sequence of bits may be generated by randomly generating bits and including the randomly generated bits in a content object that may be provided to two or more entities.

An embodiment may include, prior to the encrypting and XORing, including error detection information in the data. The second unit may be adapted to, prior to encrypting the data, prompting a user to provide a confirmation; and if confirmation is received from the user then performing the encryption, wherein the encryption serves as a proof of signature.

An embodiment may include, prior to the encrypting, XORing the data using bits in a third portion of the sequence. The first, second, and third portions may be obtained from predefined offsets in the bit sequence. Offsets in the bit sequence may be advanced periodically or based on an event. Offsets may be synchronously and automatically advanced by the first and second entities.

Other aspects and/or advantages of the present invention are described herein.

BRIEF DESCRIPTION OF THE DRAWINGS

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Some embodiments of the invention are illustrated by way of example and not limitation in the figures of the accompanying drawings, in which like reference numerals indicate corresponding, analogous or similar elements, and in which:

Figure 1:
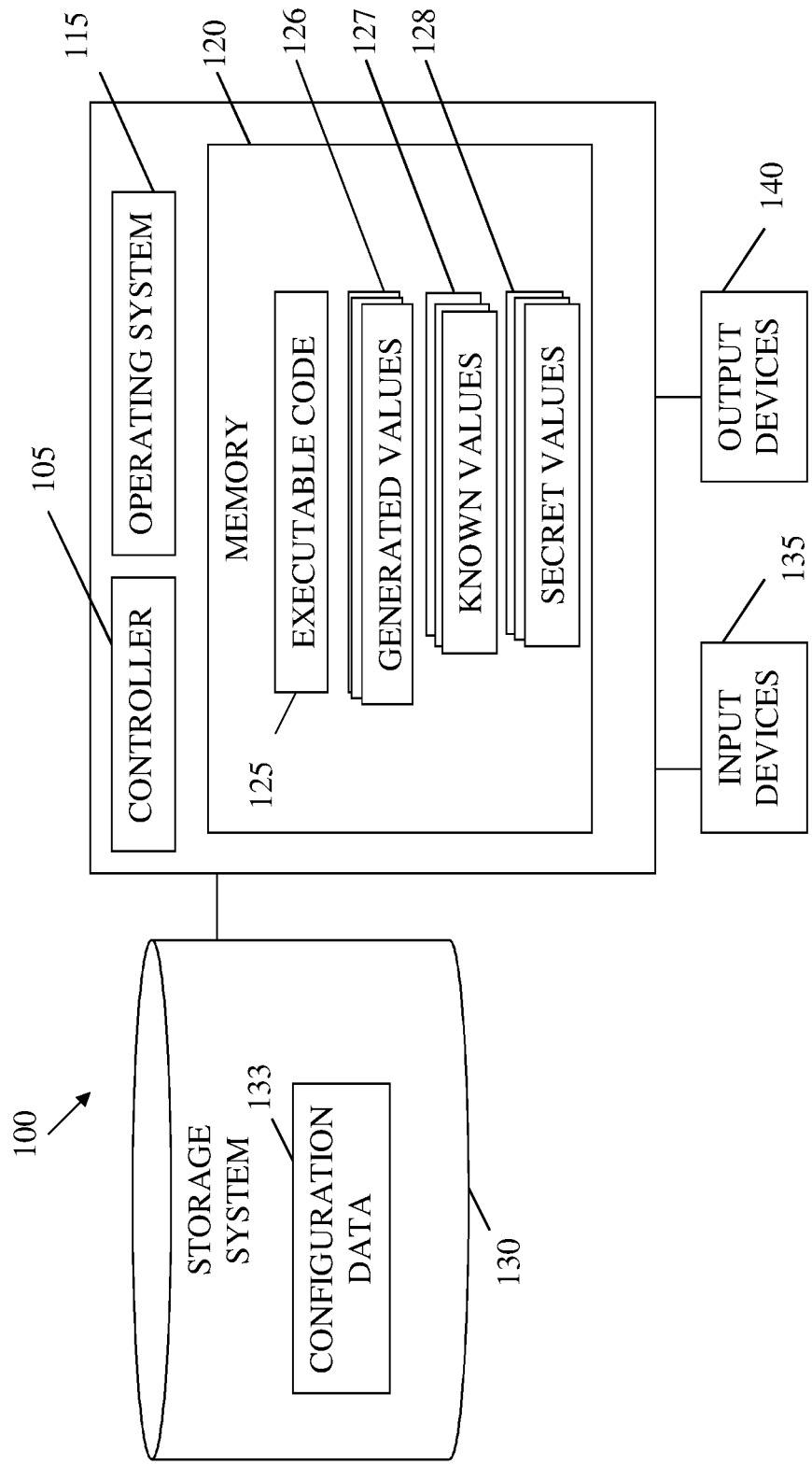
FIG. 1 shows a block diagram of a computing device according to illustrative embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although some embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a block diagram of a system or computing device 100 according to some embodiments of the present invention. Computing device 100 may include a controller 105 that may be, for example, a central processing unit processor (CPU), a chip or any suitable computing or computational unit or component. Computing device 100 may include an operating system 115, a memory 120 that may include executable code 125, generated values 126, known values 127 and secret values 128. As shown, computing device 100 may include or be operatively connected to storage system 130, input devices 135 and output devices 140. As shown, storage system 130 may include configuration data 133.

Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to some embodiments of the invention. Controller 105 may be or may include a microprocessor, a microcontroller, a digital signal processor (DSP), a field programmable gate array (FPGA), a programmable logic device (PLD), a state machine, gated logic, discrete hardware components, dedicated hardware finite state machines, or any other suitable hardware.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system, e.g., Windows, Linux, Android and the like.

Memory 120 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Each of generated values 126, known values 127 and secret values 128 may be, or may include, a number, a value, a code, a set of numbers or values, a string (e.g., one or more characters, for example, represented using their respective American Standard Code for Information Interchange (ASCII) code or value) or any digital object that includes or represents a value, e.g., an object or memory segment the size of 32, 64 or 128 bits. Known values 127 may be, or may be calculated based on, a value that is known to, or included in, a device, e.g., a serial number embedded in a ROM and printed on the back of a network hub, a value entered by a user, etc.

Any number of known values 127 may be included in a device, module or unit (e.g., in a security enforcement unit as described herein). For example, several known values 127 such as a serial number, the manufacture date and time and/or identification (ID) code of an appliance may be known to, or included in, an appliance (e.g., stored in ROM) and known to, or included in, a user's smartphone (e.g., entered by the user).

Generated values 126 may be, or may include, a value generated and stored, in a device, by a user and/or manufacturer or it may be randomly generated by a device as described herein, e.g., generated values 126 may be randomly selected and/or generated by computing device 100 or it may be randomly selected and/or generated by a remote device and provided to computing device 100. Any number of generated values 126 may be (and typically are) included in a device, module or unit (e.g., in a security enforcement unit as described herein).

For example, one or more generated values 126 may be generated for each new communication channel, or session, between computing device 100 and a remote device or one or more generated values 126 may be generated once per device, e.g., upon a first or initial communication with a remote device and/or during a process of authenticating a remote device. Secret values 128 may be calculated, defined and/or determined based on one or more generated values 126 and/or one or more known values 127.

Randomly generating a value or number as referred to herein may be, or may include, generating a value or number that cannot be reasonably predicted, e.g., as done for lottery games or by a random-number generator (RNG) as known in the art.

Generated values 126, known values 127 and secret values 128 may be complex values, numbers, codes or objects, for example generated values 126 and/or known values 127 may be, may represent or may include, a pair of values that represent a point $(x_i, y_i)$ on a polynomial $p(x)$. For example, using predefined logic or function, a value in a barcode may be used to calculate a set of $(x_i, y_i)$ values or points and the set may be stored in one or more of known values 127.

Executable code 125 may be any executable code, e.g., an application, a program, a process, task or script. Executable code 125 may be executed by controller 105, possibly under control of operating system 115. For example, executable code 125 may be an application that secures a communication channel and/or authenticates a remote device as further described herein. Embedded in memory 120, executable code 125 may be firmware as known in the art.

Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., security enforcement unit 211 described herein) may be, or may include, controller 105, memory 120 and executable code 125.

Figure 2:
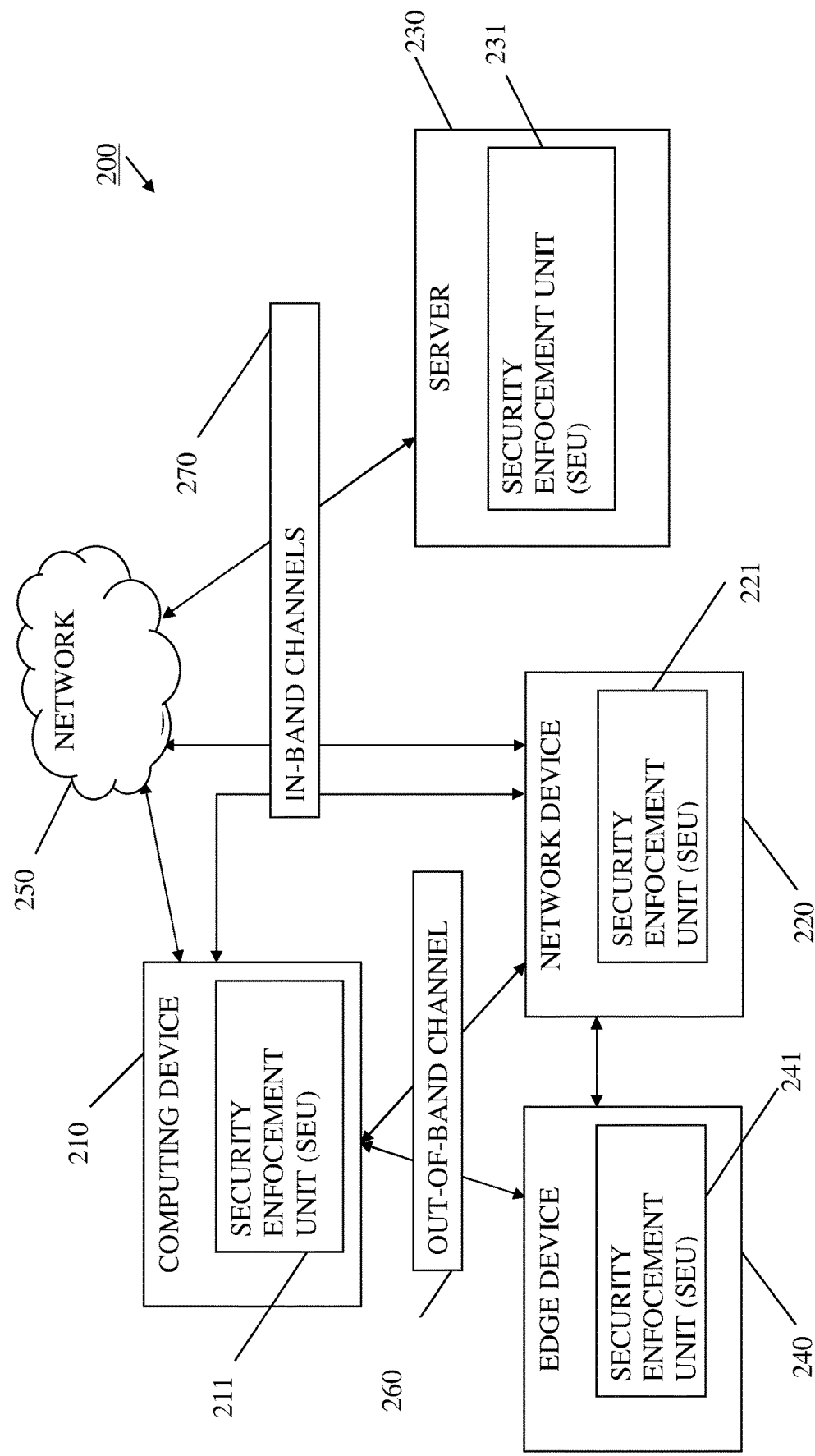
FIG. 2 is an overview of a system according to illustrative embodiments of the present invention.

For example, the components shown in FIG. 2, e.g., security enforcement units 211, 221 and 231 as further described herein may be, or may include components of, computing device 100, e.g., include a controller 105, a memory 120 and executable code 125. For example, by executing executable code 125 stored in memory 120, controller 105, e.g., when included in a security enforcement unit as described, may be configured to carry out a method of enforcing security by for example, executing software or code stored in memory 120. For example, included in a security enforcement unit in a first device, controller 105 may be configured to obtain a first value that may also be obtained by a remote (or second) device; randomly select a second value and send the second value to the remote device; use the first and second values to define a third value; and use the third value to secure a communication channel with the remote (or second) device and/or use the third value to authenticate the remote device.

Storage system 130 may be or may include, for example, a hard disk drive, a Compact Disk (CD) drive, a CD-Recordable (CD-R) drive, a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, included in a network hub, a smartphone, cellular phone, or in a wearable device, memory 120 may be a non-volatile memory or a non-transitory storage medium having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, any one or more of a wired or wireless network interface card (NIC); a WiFi or Bluetooth component or chip; a universal serial bus (USB) device; or an external hard drive may be included in, or connected to computing device 100 by, input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal or laptop computer, a server computer, a network device, a smartphone, smartwatch or other mobile device, an IoT device or object, or any other suitable computing device. An IoT device may include any component or system enabling the IoT device to communicate over a network (e.g., over the internet or over a WiFi or Bluetooth network). For example, an IoT device may be designed or adapted to communicate with remote devices using the internet protocol (IP). Accordingly, a system as described herein may include any number of devices such as computing device 100.

Reference is made to FIG. 2, an overview of a system 200 according to some embodiments of the present invention. As shown, system 200 may include a security enforcement unit (SEU) 211 that may be, or may be included in, computing device 210. Computing device 210 may be, or may include components of, computing device 100. For example, computing device 210 may be a laptop, a server, a smartphone, a smartwatch or another wearable or mobile device and SEU 211 may be or may include: memory 120; executable code 125; and controller 105.

As further shown, system 200 may include a network device 220 that may include an SEU 221, for example, network device 220 may be a network hub, network router or any other device connected to a network. For example, network device 220 may be a device connected to an in-house network, e.g., a local and/or secured WiFi network, a private IP network and the like.

As further shown, system 200 may include edge device 240 that may include an SEU 241, for example, edge device 240 may be an IoT device or any other device connected to a network. Server 230 may be a network server as known in the art and may include an SEU 231 as shown.

For the sake of clarity, only one server 230, one computing device 210, one network device 220 and one edge device 240 are shown in FIG. 2, but it will be understood that any (possibly large) number of servers 230, computing devices 210, network devices 220 and edge devices 240 may be included in system 200. For example, system 200 may include or connect several servers 230, several computing devices 210 (e.g., a laptop, a smartphone or a server), a plurality of network devices 220, e.g., several network hubs and any number of edge devices 240 such as IoT or other edge devices, e.g., IoT devices or units in a washing machine, a climate control system and an insulin pump. Each of devices 220, 240 and server 230 and/or SEUs 211, 221, 231 and 241 may be, or may include components of, computing device 100 as described with respect to computing device 210, it will therefore be understood that any function, operation or logic performed by one SEU as described herein may be performed by other SEUs.

Each of SEUs 211, 221 and 231 may be, or may include components of, computing device 100, it will be understood that any function, operation or logic performed by one of these SEUs as described herein may be performed by other SEUs.

Network 250 may be, may comprise or may be part of a private or public IP network, or the internet, or a combination thereof. Additionally or alternatively, network 250 may be, comprise or be part of a global system for mobile communications (GSM) network. For example, network 250 may include or comprise an IP network such as the internet, a GSM related network and any equipment for bridging or otherwise connecting such networks as known in the art. In addition, network 250 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 250 are implied but not shown, e.g., access points, base stations, communication satellites, GPS satellites, routers, telephone switches, etc. It will be recognized that embodiments of the invention are not limited by the nature of network 250.

Out-of-band channels 260 may be, or may include, a direct line of site (e.g., enabling a user to read a code printed on a device), a Short Message Service (SMS) message sent from a trusted person, a push notification or message from a server, a conversational exchange between one or more people, e.g. a verbal conversation, a conversation via telephone, electronic mail (email) and the like. It will be understood that, where applicable, an out-band-channel may be established between any two entities or devices included in an embodiment, and that not all possible out-of-band channels are shown in FIG. 2, e.g., although it may be established, an out-of-band channel between computing device 210 and server 230 is not shown.

In-band channels 279 may be, or may include, a network connection or channel, e.g., in-band channels 279 may be one or more of: a Transmission Control Protocol (TCP) connection; a Secure Sockets Layer (SSL) session; or a sequence of User Datagram Protocol (UDP) packets over network 250. For example and as shown, an in-band channel may be established between server 230 and network device 220 or between server 230 and computing device 210 (e.g., over network 250 that may include the internet) and/or between computing device 210 and network device 220, for example, a TCP connection between computing device 210 and network device 220 may be established over a private or public IP network, e.g., over a network inside an organization or over the internet. It will be understood that not all possible in-band channels are shown in FIG. 2, e.g., although it may be established, an in-band channel between edge device 240 and computing device 210 is not shown.

An embodiment may provide, to at least two devices, a secret (e.g., one or more secret values 128 that may be used for encrypting data) without exposing the secret to any device other than the at least two devices, that is, an embodiment may make it impossible for any device other than the two devices to reveal the secret. For example, a secret may be revealed by the two devices using a first value that may be provided or known to, or obtained by, the two devices (e.g., one of known values 127) and a second value that may be randomly selected by one of the devices (e.g., one of generated values 126) wherein the first value is communicated or provided over a first channel (e.g., an out-of-band channel) and the second value is communicated or provided over a second channel (e.g., an in-band channel).

An embodiment may authenticate a first device by, or to, a second device in a manner that makes it impossible for any third or other device to obtain enough information that may enable the third or other device to be falsely authenticated. For example, a successful establishment of a secured channel between edge device 240 and network device 220 may cause edge device 240 to identify or mark network device 220 as an authenticated device.

In some embodiments, using a first and a second values (e.g., a known value 127 and a generated value 126) known to two devices, a secret may be revealed by, or known to, the two devices. For example, the secret may be a third value that may be calculated or determined based on the first and second values. For example, using one or more known values 127 and one or more generated values 126, one or more secret values 128 may be calculated, derived or determined and may be stored in a memory as shown by secret values 128.

An authentication of a device may be explicit, e.g., as described herein or it may be implicit, e.g., successful exchange of data that is encrypted using a secret value 128 may authenticate a device, e.g., the washing machine may be authenticated by a smartphone if it sends expected data or messages or correctly responds to messages.

As described, any number of generated values 126 may be used for defining or calculating one or more secret values 128. For example, a secret value 128 may be the free coefficient of a polynomial or the highest coefficient of the polynomial (also referred to as the first and last coefficients of the polynomial). Accordingly, in order to determine or calculate a secret value 128, an SEU may use several points on a curve representing the polynomial.

For example, a polynomial over a finite field p(x) of degree k may be defined or represented by:

$$p(x)=S+a_1*x+a_2*x^2+\ldots a_k*x^k \qquad \text{Equation 1}$$

In some embodiments, S and/or $a_k$ in equation 1 may be treated and used as secret values 128, e.g., S and/or $a_k$ may be stored as secret values 128 and used for authentication and encryption, by SEUs, as described. In some embodiments, the coefficients $a_1 \ldots a_k$ of p(x) may be randomly chosen, e.g., by an SEU. A set of at least k+1 values (or inputs) for a set of $x_0 \ldots x_k$ may be randomly selected or chosen, e.g., by an SEU, and a respective set of values (or results or outputs) $y_i$ may be calculated by $y_i=p(x_i)$. Accordingly, a set of pairs $(x_i,y_i)$ for p(x) may be generated. A pair of values $(x_i, y_i)$ calculated for a polynomial as described may be referred to herein as a point on, or of, the polynomial. Using k+1 points of a polynomial of degree k, the polynomial can be constructed and S (or $a_0$, the free coefficient) and/or $a_k$ (the highest or last coefficient) can be revealed. For example, in order to construct the line equation p(x)=ax+b, 2 points $(x_1,y_1)$ and $(x_2,y_2)$ are required and sufficient and the two points enable determining the value of b.

For example, a first pair of $(x_i,y_i)$ values of p(x) may be stored in a first generated value 126 in edge device 240 and in network device 220, a second, different, pair of values $(x_{i+1},y_{i+1})$ may additionally be stored in a second, different, generated value 126 of both edge device 240 and network device 220 and so on. Accordingly, each of edge device 240 and network device 220 may obtain, possess, store or include at least k+1 pairs, values or points of (or on) p(x), and may therefore unambiguously identify or characterize p(x) and thus determine S and/or $a_k$ in equation 1.

As described, a degree of p(x) may be predefined (e.g., hard coded or otherwise known to two or more SEUs). In order for security to be increased, in some embodiments, the degree of p(x) may be selected or set dynamically or automatically, e.g., a first device may randomly select the degree and inform the second device of the degree. In yet other embodiments, using a function or logic that takes into account, for example, the current date, current time or other dynamic value, two SEUs may determine the degree of p(x) that will be used. Once the degree of p(x) is known to two devices, the two devices may readily know the number of points that need to be shared as described.

In some embodiments, two or more devices may share the generation of values or points that define a polynomial. Moreover, in some embodiments, a polynomial p(x) needs not be defined, predefined or known in advance. For example, p(x) may be defined (and identified) based on a random set of points or pairs of $(x_i,y_i)$ values that may be generated or selected by two devices.

For example, a set of at least k+1 of points (e.g., pairs of input and output values of the polynomial) for a polynomial may be randomly selected (e.g., some may be selected by a first device or entity, and some by another or second device or entity) and may be sent from one entity or device to another entity or device such that none of the devices on or along the routes that are used can obtain, capture, intercept or see k+1 or more points. It is noted that a subset of less than k+1 points is useless in determining, identifying or characterizing a polynomial of degree k, for example, one point (e.g., one set of $(x_i,y_i)$) is insufficient or useless for determining, identifying or characterizing a polynomial p(x) of degree k=1 defined or characterized by $a_0+a_1x$ since at least k+1 (2 in the case of k=1) points are required in order to define, determine, characterize or unambiguously identify polynomial of degree k.

For example, SEU 211 may randomly select a degree of six (k=6) for a polynomial and may further randomly select three (3) points, or pairs of input and output values of the polynomial, and send the degree and the three points to SEU 221. SEU 221 may randomly select four (4) points or pairs and send the selected four points to SEU 211. Thus, an embodiment achieves a state where SEU 211 and SEU 221 both have seven points for a polynomial of degree six and are therefore able to unambiguously identify, determine or characterize the polynomial and its coefficients (e.g., $a_0$, $a_1$ and so on). As described, the points or pairs may be communicated between SEU 211 and SEU 221 over at least two different network routes, such that no single entity on, or connected to, network 250 (or any other network for that matter) can obtain k+1 pairs or points included in the set of at least k+1 pairs or points exchanged between a first and a second device as described.

Routes, links, connections and/or channels as described herein may be logical, physical or a combination thereof. For example, a logical route, link or channel may be a TCP connection or an SSL connection and a physical route, link or channel may be a direct line or data bus connecting two or more devices. For example, several routes, links and/or channels may be established between computing device 210 and edge device 240 using a set of TCP connection (logical) and one or more physical lines, routers or wires (physical). A set of different logical connections may be established over one or more physical connections. Generally, a set of logical routes, links or channels may be established over the same infrastructure, e.g., same network cables and routers. For example, a set of different applications or social networks (e.g., Facebook, WhatsApp and the like) may use the same infrastructure to setup and use a set of different logical connections that use different protocols, encryption techniques, etc. A set of different physical routes, links, connections and/or channels may be established on a respective set of different infrastructures, e.g., a wired network infrastructure, a cellular network and/or WiFi.

As further described herein, different routes, links, connections and/or channels may include, traverse or established using different devices or nodes. For example, a first route, link, connection and/or channel between server 230 and edge device 240 may be established through or via network device 220 (e.g., using routing as known in the art)

and a second route, link, connection and/or channel between server 230 and edge device 240 may be established through or via computing device 210. A link, connection or channel may be an out-of-band link, channel or connection as further described herein.

After constructing the polynomial from the k+1 pairs, SEU 211 and SEU 221 may calculate or reveal a secret, e.g., the secret revealed, identified or determined by SEU 211 and SEU 221 may be based on a function of, or applied to, the polynomial or points of the polynomial. For example, a secret may be a function, or a result of a function of, or applied to, at least one of the first and/or last coefficient of the polynomial as described. A function of, applied to, or that uses as input, at least one of the first and last coefficients of a polynomial may include any mathematical manipulation of numbers that produces a result as known in the art. For example, a function of at least one of the first and last coefficients of a polynomial may include multiplying the free coefficient of a polynomial by the highest coefficient, or it may include dividing the highest coefficient by the free coefficient and then adding one of these coefficients to the result, where the mathematical operations are defined over a finite field. A result of a function of at least one of the first and last coefficients of a polynomial may be a number or value, e.g., an output or result of a mathematical function as known in the art.

Any function, mathematical function or mathematical computation (e.g., one known only to SEUs) may be applied to a secret in order to determine or generate an encryption key, seed or other value that may be used for securing a communication channel. For example, to generate an encryption key that may be used to encrypt data or otherwise secure and authenticate a communication channel between SEU 211 and SEU 221 and/or between computing device 210 and network device 220, a coefficient of a polynomial determined, discovered or identified as described may be multiplied by two, divided by three and the like, and the result may be the encryption key, seed and the like.

It will be noted that the two devices sharing a secret as described herein may be any two devices, e.g., a client and a server such as computing device 210 and server 230 may each generate some of the k+1 points that define a polynomial, share the points as described and thus reveal or determine a secret that may be based on a function of the polynomial, and likewise network device 220 and edge device 240 may share a secret. It will be understood that any computing device may include an SEU as described and, accordingly, any computing device may participate in sharing a secret as described herein.

As described, a set of values (e.g., a set of points of a polynomial) may be sent or exchanged between devices over a set of different routes or communication channels. For example, SEU 211 may generate a set of k+1 points, store the set in a local set of generated values 126 and send the set of k+1 points to SEU 221 using (at least) two (physical or logical) different channels, e.g., using an in-band and an out-of-band channel, two out-of-band channels, two in-band channels or any combination of channels or routes as described.

Secret value 128 may be calculated separately on both devices or sides, e.g., SEU 211 and SEU 221 may each, independently from one another, determine or identify p(x) based on k+1 points as described, determine the free or highest coefficient of p(x) and use the coefficient as, or to generate, secret value 128, e.g., secret value 128 may be the coefficient itself, or it may be calculated based on the coefficient using any mathematical function or algorithm, for example, secret value 128 may be calculated, by SEUs, based on a coefficient of p(x) and based on the current time and/or date or using any mathematical function, algorithm or logic.

In some embodiments, in order for a secret (e.g., an encryption key or a seed as known in the art) to be shared between two devices, at least two values may be provided, or made known to, the two devices, for example, the two values may each be, or include or represent, a point, or a pair or set of input and output values $(x_i, y_i)$ of a polynomial p(x) and the secret may be a function of, or based on, these values, e.g., a mathematical function or manipulation of, or applied to, coefficients of a polynomial defined by the points as described.

It is noted that the at least two values may be randomly selected by the first device or may be randomly selected by the first device and the second device. For example, the first device may randomly select a first point of (yet to be defined by an additional point) p(x) and send the first point to the second device, and the second device may randomly select a second point that completely defines p(x) and sends the second point to the first device. Assuming p(x) is of first degree, the two points randomly selected as described enable the two devices to unambiguously identify p(x). Of course, any higher degree of p(x) may be chosen and used, e.g., by causing embodiments to randomly select share more points as described.

As described, some embodiments of the invention address challenges faced by the industry. For example, unlike any other existing authentication schemes, some embodiments of the invention avoid exchanging or communicating a secret, avoid sending a secret over a network as done by known systems and methods. For example, secret value 128 may be known (e.g., based on a set of points as described) to SEU 241 and SEU 221 without ever being transmitted or sent from one of these SEUs to the other.

The process of generating, sending and using a set of values to determine a secret as described herein may be done either once for two not necessarily identical devices, e.g., on initialization, or may be done before each session. For example, a communication channel between edge device 240 and network device 220 may be terminated as known in the art and, to establish a new channel between these devices, the flow that includes generating and sharing values, identifying or constructing a polynomial, determining a coefficient and a secret as described herein may be repeated. For example, a first point may be defined (provided or sent) once (e.g., when a new device is added to a network), e.g., over an out-of-band channel and the other points may be sent over a network before each session.

Although examples that include providing a first value to a first device over an out-of-band channel and providing a second value (to the first and/or to a second) device over an in-band channel are described herein, it will be understood that any combination of in-band channels and out-of-band channels may be used to share values or points between two devices. For example, two different routes or in-band channels may be used to share or communicate points between network device 220 and edge device 240 or two out-of-band channels may be used to share values or points between these two devices. It will further be understood that, for the sake of clarity and simplicity, the description mainly refers to two values shared over two channels, and any number of values may be shared over any number or combination of channels that may be out-of-band and in-band channels. For example, to authenticate edge device 240 to computing device 210, a polynomial of degree 5 may be used and, accordingly, six different values may be shared between edge device 240 to computing device 210 as described, e.g., over two out-of-band channels and four in-band channels.

Yet another improvement to the field of security and authentication introduced or enabled by some embodiments of the invention has to do with providing an edge device with a first or initial point or value that may be used, in conjunction with a second value sent before each session, to determine a secret used for securing data as described. For example, using an initial value, edge devices do not need to keep or store a private key when they are not communicating over a network. This may be highly advantageous, e.g., in cases where the edge device does not have the capacity to dynamically and securely store data, for example, in that case of IoT devices or environment where the edge devices have low CPU power and minimal unsecured hardware (e.g. a light bulb).

Some embodiments may include inductive multi-route authentication and common secret establishment using parties or devices that already (possibly incrementally) established trust (possibly via inductive multi-route authentication and common secret establishment) with a new device by using secret sharing. The term "trust" as referred to herein may relate to, or mean, authentication, verification or identification. For example, an identified device may be referred to herein as a trusted device, and authenticating or identifying a device may be referred to herein as establishing a trust in the device and so on.

For example, a device (e.g., denoted "device A") may use authenticated and secure communication with one or more entity/device that are capable to communicate with a new or additional device (e.g., denoted "device N") with which there is a need to create a common secret, e.g., in order to authenticate the new device N and/or establish a secured channel between device A and new device N. Some values or points may be sent, to device N, through direct physical/logical communication channels while other values or points may be sent, to device N, via an already trusted entity or device (possibly trusted due to the previous steps of the inductive multi-route authentication and common secret establishment).

Accordingly, authenticity or trust level of the new device N may be yielded from, based on, or a function of, the authenticity of each of the already trusted or authenticated devices that directly communicate with the new device and the corresponding authenticity or trust level of the direct channel used by device A when directly communicating with device N. The authentication level obtained implies also the secrecy level obtained following the establishment of a shared key or other secret between the sender and the new device. For example, device A may be server 230, new device N may be edge device 240 and SEU 231 may use an already trusted or authenticated connection between server 230 and network device 220 to send one of a set of values to edge device 240, e.g., SEU 221 may receive a value from SEU 231 and may forward the value to SEU 241 over a secured communication channel, e.g., a communication channel secured as described herein.

As described, based on a common or known secret, devices may authenticate each other. Possibly after an authentication as described, an embodiment may enable a protected and/or secured exchanged of data between devices.

In some embodiments, data communicated from one device to another may be sent over several channels, routes, links or lines, e.g., data may be sent over several channels or routes as described herein with reference to the points or value pairs. Different channels or routes may include or traverse different sets of devices. For example, a first channel, route, link or line between a first and second devices may traverse, pass, or be implemented using a third device (e.g., a first network router or any other device), and a second channel, route, link or line between the first and the second devices may traverse, pass, or be implemented using a fourth device (e.g., a second, different network router or any other device).

In some embodiments, a data object to be sent (e.g., a message or file) may be broken into chunks, blocks or pieces, and each of the chunks blocks or pieces may be sent using secret sharing or bit-wise-xor or over at least two channels, routes, links or lines such that no entity or device can obtain or possess enough chunks or pieces of the data object for reconstructing the data object.

For example, in some embodiments, between each two devices there are at least two different channels, links or routes (e.g., at least two different physical or logical channels, links or routes as described). Each such channel may be composed of two or more links, where each link may be a secure channel between two entities. For example, in a smart home, a light bulb can communicate with a central hub in two channels, of which one or first channel may be a direct channel, link or connection from the light bulb to the hub, and the other, second channel may pass through some other device, such as a refrigerator, and thus the second channel may be composed of two secure links, one from the light bulb to the refrigerator and the other from the refrigerator to the hub.

A secret, e.g., secret value 128 may be used for securing or protecting data, e.g., as known in the art, for example, secret value 128 may be used as a symmetric key in a symmetrical encryption algorithm or technique, e.g., in AES256 as known in the art.

In some embodiments and as described, sharing one or more values between first and second devices, e.g., sharing one or more generated values 126 or points as described, may include sending at least one of the one or more values, from the first device to a third device over a secured communication channel between the first and third devices, and using the third device to provide the at least one of the one or more values to the second device. Communicating a set of values (e.g., one or more points or generated values 126) from a first device to a second device may include sending at least one of the values, from the first device to a third device, and sending or forwarding the at least one of the values from or by the third device to the second device. Otherwise described, a first device may send a value to the second device via a third device.

For example, to authenticate edge device 240, device 210 may send a value (e.g., a point of a polynomial as described) to network device 220 (e.g., over a secured channel and/or after device 210 has authenticated network device 220), and network device 220 may send or forward the value received from device 210 to edge device 240. A second value or point may be sent from device 210 to edge device 240 over any other channel, e.g., an out-of-band or other channel as described herein.

In some embodiments, an overlay technique may be used to secure communication scenarios such as client-server, business to business (B2B), client to business (C2B) and/or client to client (C2C). As referred to herein, a share or shares may be pieces or portions of data that may be used to determine or produce a secret or an original data object or value, e.g., a set of shares may be used to determine or reveal a password.

In some embodiments, an overlay technique may include secret sharing or other equivalent secure information theoretical schemes, e.g., exclusive-or, or exclusive-disjunction (xor or XOR) with a random sequence or using modular arithmetic as done, e.g. in one-time pad practice as known in the art. An overlay technique may include sending shares (e.g., a set of values as described) over a set of communication channels, some or all of which are physical and/or some or all of which or are logical channels.

A logical communication channel may be, for example, a virtual private network (VPN), an SSL connection, a transport layer security (TLS) connection, a push notification, an instant messaging communication and/or any other system, method or protocol that may include authenticating and/or securing communication. Two or more logical communication channels may use the same physical channel or may use separate, different physical channels (e.g., wired and wireless channels as known in the art).

In some embodiments, an overlay security technique may benefit from sending secret shares on (possibly encrypted) channels over physical and logical channels by ensuring that, unless the information sent over all (or enough of) the channels used is captured and decrypted (when the logical channel is using its encryption) by a malicious entity, the information secret shares or other sent information is protected and secured, possibly by means of error correcting technique such as Berlekamp Welch. Accordingly, using an overlay technique or security as described herein, some embodiments of the invention may provide security that is stronger than the (currently) strongest authentication and security among the physical and logical channels used for sending the secret shares, as information on all channels should be revealed to expose a (possibly encrypted) secret shared or other information.

In some embodiments, an overlay security technique may provide and/or ensure automatic inheritance of the secrecy, security and/or authenticity updates and/or enforcement of each of the logical and/or physical routes, links or communication channels. In some embodiments, a communication channel may be authenticated and secured even if a vulnerability in all but one of the channels used is exploited. In some embodiments, error correction techniques (e.g., the Berlekamp-Welch or Welch-Berlekamp algorithm) may be used for coping with malicious channels.

Some embodiments may address the challenge of securing client server communication and authentication. For example, some embodiments may enable both a client and a server to be identified and/or authenticated to each other and to further be securely connected through an entire communication session. For example, some embodiments may provide authentication that enables a server to guarantee or verify that it is communicating with the right client, e.g., not with an entity that stole the identity of the client (e.g., using identity theft as known in the art). Some embodiments may provide authentication that enables a client that it is indeed communicating with the right or intended server, e.g., eliminating or overcoming phishing attacks or man-in-the-middle (MITM) attacks. Some embodiments may provide privacy, e.g., by eliminating data in motion attacks. Some embodiments may provide security related to client approval or confirmation, e.g., approval of transactions.

As further described, some embodiments may be applicable to any computing device, e.g., mobile phones or other mobile devices, home or other computers, servers and the like. Some embodiments may require no change to existing computing devices, may easily integrate with existing environments and may provide complete, full proof protection against attacks such as MITM, phishing and data in motion attacks. Some embodiments use a secret sharing scheme for distributing a secret among multiple participants.

Some embodiments of the invention may include identifying an entity. For example, an entity identified as described herein may be a new employee in an organization that needs to be identified to, or verified by, a server in the organization or the new employee may be required to be identified, authenticated or verified to, or by, any identifying entity. Identifying an entity (e.g., a person or device) may be performed as part of an enrollment or registration procedure, e.g., as part of an enrollment to a service, organization or platform. For example, an identifying entity may be a server, platform, service and/or application of an organization and the identifying entity may identify, authenticate or verify a new employee, device or any entity that needs to be identified, e.g., prior to being granted access to resources of the organization. For example, an identifying entity may be a mail server of an organization that may identify (and/or authenticate, or verify the identity of) a new employee prior to granting the new employee access to mail or an identifying entity may be an access point in a network of the organization that may identify (and/or authenticate, or verify the identity of) a new employee prior to granting the new employee access to the organization's network.

Figure 3:
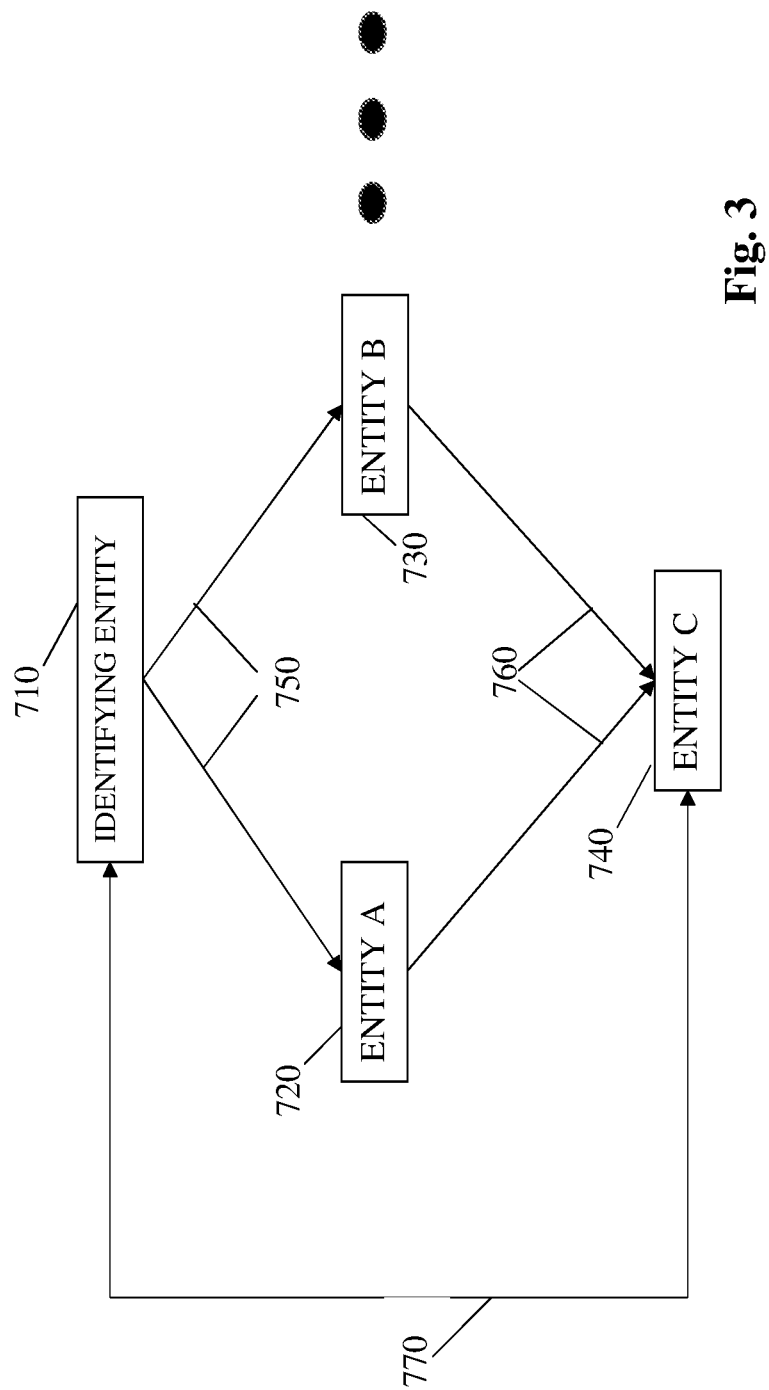
FIG. 3 shows a flow chart of a method according to illustrative embodiments of the present invention.

Reference is made to FIG. 3, showing a system and flows according to illustrative embodiments of the present invention. As shown by FIG. 3, a system may include an identifying entity 710 and a plurality of entities as shown by blocks 720, 730 and 740.

Generally, identifying entity 710 may be any entity that identifies, authenticates and/or verifies the identity of users, subscribers or other entities, for example, prior to allowing users or devices to access resources in an organization, bank or medical institute, identifying entity 710 may identify, authenticate or verify the identity of users or devices. For example, identifying entity 710 may be a server, service or application in an organization or institute. For example, identifying entity 710 may be an exchange or other mail server in an organization or identifying entity 710 may be any other server, service or application of a bank or a medical institution. Identifying entity may be, or may include components of computing device 100, for example, identifying entity 710 may be a computing device similar to server 230.

Entity 740 may be an entity that needs to be identified, authenticated or verified. For example, entity 740 may be a device of a new employee in an organization, e.g., an employee (and/or device) that is yet unknown to, or unregistered with, identifying entity 710, or entity 740 may be a new device connected to an internal or other network of an organization, or entity 740 may be a new (yet unregistered) client of a bank and so on. Entities 720 and 730 may be any computing devices, e.g., computing devices like computing device 100. As described, entities 720 and 730 may receive values (e.g., generated values 126 or other secret values) from identifying entity 710 and send, forward or otherwise provide the values to entity 740, accordingly, entities 720 and 730 may be referred to herein as intermediate entities.

In some embodiments, to identify an entity (e.g., to identify a new or yet unknown or unregistered user or device), at least one of first and second values may be provided to a respective at least one of first and second devices. For example, identifying entity 710 may provide at least one of first and second values to at least one of entity 720 and entity 730. For example, a server (e.g., a server similar to server 230) in an organization may send a first value (e.g., a generated value 126 or secret value as described herein) to entity 720 and the server may send a second generated value 126 to entity 730. As further described, in some embodiments, in order for a new or yet unidentified entity to be identified, two or more values may be provided to the new entity via two or more already trusted entities, in other embodiments, configurations or cases, one of the values may be provided to the new entity directly by the authentication entity.

A first and a second value may be used, by an entity, to identify itself, e.g., to an identifying entity. For example, entity 740 may use two or more values (provided to entity 740 as described herein) to generate a secret value that may be known to identifying entity 710 and, by providing the secret value to identifying entity 710 (and/or otherwise prove possession of a secret value or a set of values), entity 740 may identify itself to identifying entity 710 or be otherwise identified, authenticated or verified. Communicating values, e.g., between any or identifying entity 710, intermediate entities 720 and 730 and entity 740, may be done as described herein, e.g., over in-band and/or out-of-band channels, logical and/or physical channels etc. For example, two values sent to entity 740 as described herein may be sent using two different channels as described herein such that no entity other than entity 740 can obtain the two values.

In some embodiments, at least one of the first and second entities that were provided, by an identifying entity, with values as described, may provide the value to entity 740. For example, server 230 may provide a first value to a first computing device 210 (that may be entity 720) and further provide a second value to a second computing device 210 (that may be entity 730) and at least one of the computing devices 210 may provide (e.g., forward) the value provided by server 230 to a third computing device 210 (that may be entity 740), or to any other device that is to be identified. Entity 740 may use the at least one of the first and second values to identify itself to identifying entity 710. For example, entity 740 may identify itself to identifying entity 710 by sending, to identifying entity 710, one, two or any other number of values it received from entities such as entities 720 and 730.

It will be noted that, although, for the sake of simplicity, only at least two intermediate devices are described herein, any number of intermediate devices may be used for providing any number of values that may be used for identifying a new entity. For example, to increase any of: security; resilience and/or fault tolerance, five values may be sent, by authentication entity 710 to entity 740 via five or less intermediate entities such as entities 720 and 730. For example, for redundancy, the same value may be sent via two different nodes or entities on a network such that, if one of the values is lost, authentication may still succeed. In some embodiments, in order for redundancy or resilience of a system to be increased, a subset of values from a set of values sent to an entity that is identified may suffice to authenticate the entity. For example, identifying entity 710 may send three values (to be forwarded to entity 740) to three nodes, users, devices or entities such as entities 720 and 730 where two of the three values may be enough for identifying entity 740. For example, two points out of three points on a curve of a polynomial of first degree may suffice to identify the polynomial, or, in another example, entity 740 may be identified based on a concatenation of any two values out of three values.

It is noted that the more values (and the more intermediate nodes or entities) used, the more secure a system may be, since, the larger the number of values and/or the number intermediate nodes or entities) used, the harder it is for a hacker to obtain all of the values and, as described, all of the values may be required to share a secret between entities. In some embodiments, a secret may be used for identifying an entity, e.g., using values received from entities 720 and 730, entity 740 may discover a secret (e.g., using a polynomial, as described herein) and entity 740 may identify (or verify or authenticate) itself to authentication entity 710 by providing, or otherwise using, the secret.

Accordingly, an embodiment may securely and positively identify a new, or previously unknown, or yet unidentified entity by providing or sending one or more values to intermediate entities, users or devices, have the intermediate entities provide, send or forward the values to the new entity that is to be identified and identify the new entity based on receiving, from the new entity, the values sent to the intermediate entities.

In some embodiments, a first and a second device may be identified, by an identifying entity, prior to providing the at least a first and second values to the first and second devices. For example, entities 720 and 730 may be identified or authenticated by identifying entity 710 prior to providing them with values as described. For example, prior to providing entities 720 and 730 with values as described, identifying entity 710 may authenticate entities 720 and 730 e.g., by establishing a secured communication channel between identifying entity 710 and each of entities 720 and 730, e.g., using secret values 128, known values 127 and/or generated values 126 as described herein. It will be noted that any method may be used to make entities 720 and 730 (or other intermediate entities) trusted or identified by identifying entity 710. For example, an administrator may configure identifying entity 710 to know or trust entities 720 and 730, or entities 720 and 730 may be identified or verified, and accordingly, it will be recognized that the scope of the invention is not limited by the system or method used for authenticating or verifying entities 720 and 730. In some embodiments, instead of, or in addition to, identifying a first and a second devices prior to providing the at least first and second values to the first and second devices, a channel known to be secured may be used. For example, a secured channel (e.g., WhatsApp) may be used by identifying entity 710 to provide the first and second values to entities 720 and 730 as described.

In some embodiments, prior to providing a new entity (e.g., entity 740) with values received from an identifying entity, an entity (e.g., entities 720 and/or 730) may identify the new entity. For example, prior to providing entity 740 (that may be the new, unknown, unverified or unauthenticated) with values received from identifying entity 710, entities 720 and/or 730 may identify, authenticate or verify entity 740. For example, an administrator or user may configure entities 720 and/or 730 to know or trust entity 740 or entities 720 and/or 730 may identify or authenticate entity 740, prior to providing it with values received identifying entity 710, using a secured communication channel, generated, known and secret values as described herein. In some embodiments, prior to providing entity 740 with values as described, entities 720 and/or 730 may identify, validate or authenticate entity 740 as described herein, for example, using secret sharing and/or by establishing a secured communication channel with entity 740 as described herein.

In some embodiments, instead of, or in addition to, identifying a new entity (e.g., entity 740) prior to providing the new entity with values received from an identifying entity, a channel known to be secured may be used. For example, a secured channel (e.g., WhatsApp) may be used by entities 720 and/or 730 to send values received from identifying entity 710 to entity 740.

Accordingly, an embodiment may build a chain of trust, for example, based on a trust between entity 730 and entity 740 or an authentication of entity 740 to entity 730, a trust between authentication entity 710 and entity 740 is established. For example, once entity 740 is trusted or authenticated as described, a trust between entity 740 and a new device (not shown in FIG. 3) may be used to establish a trust between authentication entity 710 and the new device.

The advantage of using trusted devices and a trust between the trusted devices and new devices may be readily appreciated as it enables embodiments of the invention to add untrusted (or yet unauthenticated) devices using already trusted or authenticated devices. For example, if device A trusts device B (e.g., entity 710 trusts entity 730), and device B trusts device C (e.g., entity 730 trusts entity 740), then, using a method as described herein, device A can establish a trust of device C using the trust between device B and device C. Unlike known systems and methods that require an authentication entity to establish a trust with a new entity by directly communicating with the new entity, using a chain of trust as described, some embodiments of the invention may establish a trust with a new entity using previously established trust, e.g., a trust of devices that act as intermediate entities as described. It is possible that a network of trust will be constructed and updated with every new identification, possibly with feedbacks concerning false identifications. Such a network of trust can have independent applications, such as credit ranking.

Accordingly, some embodiments of the invention may provide or enable security of a system that may be built or accomplished in steps or phases where each step or phase benefits from the security established or guaranteed by the previous step, e.g., based on a security, trust or verification between entities 720 and/or 730 and entity 740, a security, identification or trust between identifying entity 710 and entity 740 may be achieved. For example, entities 720 and 730 may be known, trusted and/or identified employees in an organization, and the trust in these employees may be used to identify, and/or establish a trust of, a new employee (or employee's device) 740.

It is noted that any number of intermediate entities such as entities 720 and 730 may be included in a system or method according to some embodiments of the invention. In some embodiments, a single intermediate entity may be used. For example, in some embodiments, identifying entity 710 may send or provide a first secret value to entity 720 and may send a second value directly to entity 740. Entity 740 may use the two values (e.g., one received from identifying entity 710 and one received from entity 720) to identify itself to identifying entity 710, e.g., as described.

In some embodiments, based on identifying an entity, one or more actions or procedures may be performed, enabled or allowed. For example, any one of registering, enlisting and enrolling an entity with at least one of: a network, a platform, a server, a service and an application may be performed, enabled or allowed if, or after, an entity is identified. For example, after entity 740 is identified to or by identifying entity 710, entity 740 may be registered in or by services, platforms or services in an organization and/or entity 740 may be granted access to resources and the like. For example, if entity 740 is a new employee of an organization (or a device of the new employee), then, following an identification of entity 740 as described, the employee or device may be granted access to resources of or in the organization, e.g., printers, databases and services such as mail and the like.

Establishing trust concerning an identity is a challenge faced by the industry. For example, before money is transferred to a bank account, it may be desirable, required or necessary to verify the identity of the person and/or verify that the bank account is indeed owned by the identified person. Known certification authorities, systems and methods use keys or other credentials and a central authentication or certification authority or entity, and, accordingly, known systems suffer from a number of drawbacks, e.g., these systems are centralized and therefore do not scale easily and, using keys, these known systems are vulnerable, e.g., they can be hacked by stealing, guessing or otherwise obtaining a key. Especially the key used for signing certificates is a single point of failure that, when stolen, immediately nullifies the trust in all issued certificates, and therefore is an obvious target for hackers.

Some embodiments of the invention may include (or enable) a distributed and keyless authentication, identification and/or verification of an entity. The authentication and identification maybe based on maintained, partially public enriched phone book(s), in the form of partially public (verified) record of contact lists, including not only the name, address and phone(s) numbers but also email, messengers and other means for communicating with the entity. The contact book(s) may be maintained by one or more trusted entities. For example, in some embodiments, a certification system or method may be keyless in the sense that no keys (or other credentials) are kept, communicated or even required to authenticate or verify a user, device or any other entity. Additionally, or alternatively, an embodiment may include a distributed certification or verification system and/or method.

As further described, an embodiment may include or enable establishing trust concerning an identity of an entity by the implementation of a distributed ledger or record of entity details, possibly based on block-chain and/or distributed-ledger technology, either with or without using consensus. In some embodiments, a trust in an identity of an entity may be based on an accumulation of trust in one or more nodes (or entities) that may collaborate to create a distributed ledger.

As described, an embodiment may include a ledger that may include records of users where a record of a user may include entity details. Entity details as referred to herein may include any information related to an entity.

For example, entity details may be, or may include, any information related to a presence of a user or entity in the cloud; for example, entity details may include an address of a cloud avatar of a user or any other details related to cloud-based platforms, e.g., user name and password for Microsoft OneDrive, Dropbox, GitHub and the like. Entity details in a record or ledger may include a photo of a person, a photo of (possibly approved) official documents, a business license, a driving license, a passport, a serial number, a purchase document, contact information, an address, any biometric data (e.g., fingerprints or retinal scan), a phone number, an email address, a messenger addresses, a social network identity (e.g., details in Facebook, LinkedIn, Skype etc.), a credit history certificate, public key (possibly the value of Merkle tree root, fascinating the use of Lamport's quantum safe signatures) and the like. For example, entity details for a person may include one or more of a birth/ governmental certificate, school certificates, address certificate, passport, driving license, bank accounts, biometric details, contact list and personal events (e.g., collected from Facebook timeline). Entity details for an organization may include governmental certificate in creation, quarter/annual reports (accounting, special events), contact list (phone, emails, messengers, social networks) persons associate with the organization. Entity details for servers, machines or device such as smartphones may include a serial number registered by manufacturer, electronic fingerprints, history of purchases and locations, inventory lists, contact list including an internet protocol (IP) address or a media access control (MAC) address, geographic information. Entity details for IoT devices may include a serial number registered by manufacturer, electronic fingerprints, history of purchases and locations, Hub(s) connected to, inventory list, contact list including IP addresses, MAC address, Geographic Information Systems, Network Management Systems.

The term ledger as referred to herein may relate to any set of entity details, e.g., a record, file or any other construct or object that includes entity details as described herein. For example, a ledger may include entity details such as a user's name, user's phone number, user's address and so on. A ledger may be related to any entity. For example, if the entity is a device, then a ledger may include entity details such as a network address of the device, e.g., an IP address or a MAC address. In yet another case, when the entity is an organization, then a ledger may include entity details such as a business address, business fax number and so on.

Figure 4:
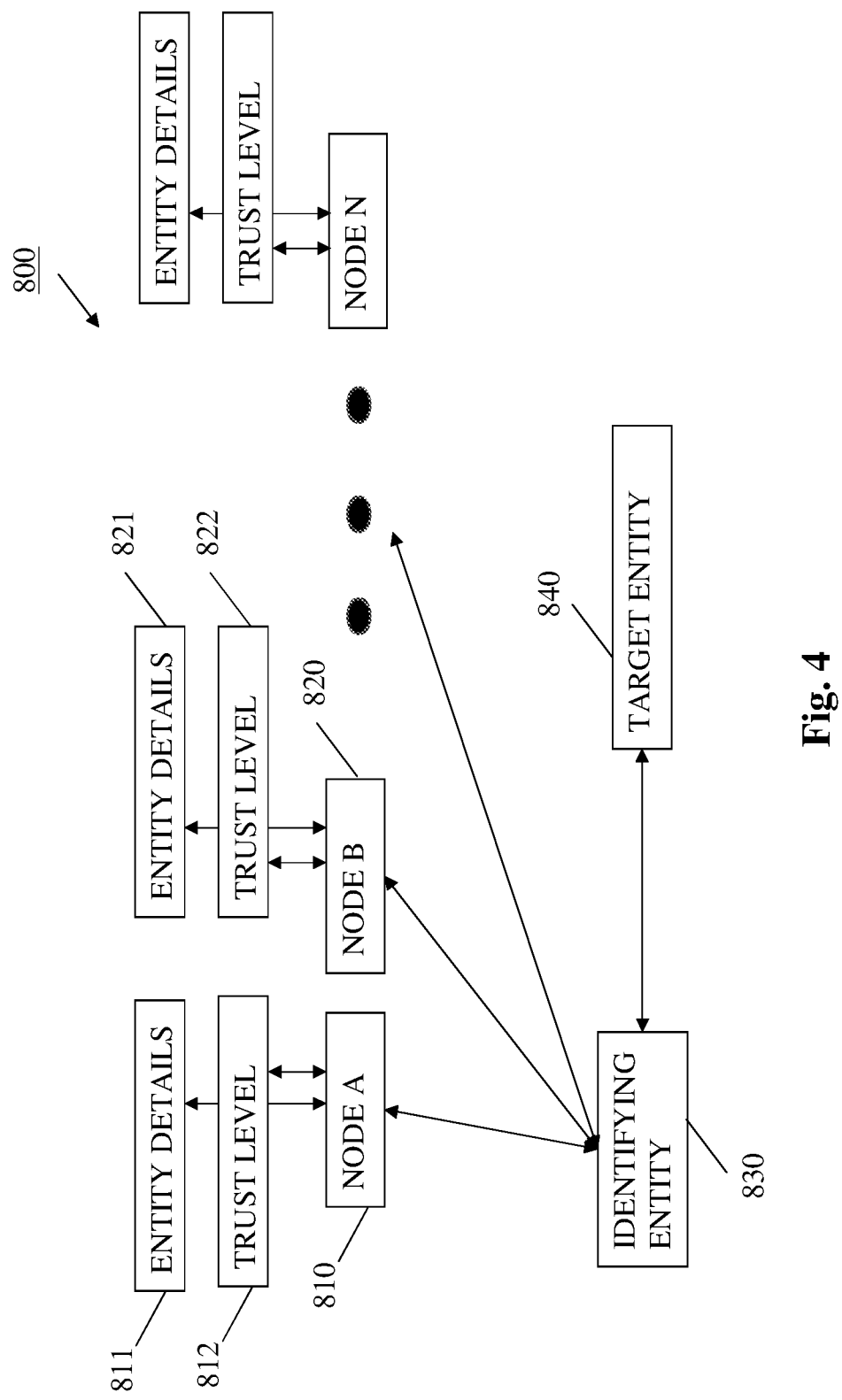
FIG. 4 shows a system and flows according to illustrative embodiments of the present invention.

Reference is made to FIG. 4, a system 800 and flows according to illustrative embodiments of the present invention. As shown, system 800 may include any (possibly large) number of entities (also referred to herein as nodes) that may each store, keep or otherwise include entity details of an entity and a trust level for each detail of the contact record for the entity. A trust level as referred to herein may be any value, score, or confidence level that reflects or indicates a level of trust in an identity of an entity. For example, a scale of one to ten (1-10) may be used where a trust level of one (1) may indicate lack of trust while a trust level of ten (10) may indicate, represent or reflect that an identity of an entity is verified, authenticated or determined with a high level of confidence or trust.

For example, a system may include node 810 that may be a bank (e.g., a server in the bank), node 820 that may be a user device (e.g., computing device 210) and so on. As shown, a large number of nodes may be included in a system, e.g., a system may include a plurality of nodes similar to nodes 810 and 820, that may be, for example, government agencies, organizations, attorneys, notaries, credit history agencies, nodes or servers in a social network, or edge-devices such as smartphones, persons, server-machines, IoT devices or any other entity or node. For the sake of simplicity and clarity, two nodes (nodes 810 and 820) will mainly be discussed herein; however, it will be understood that any number of nodes may be included in an embodiment as described herein.

As shown, a system may include an identifying entity 830. Identifying entity 830 may be any entity, user or device that wishes to identify, authenticate, validate or otherwise establish a trust in the identity of target entity 840. Target entity 840 may be any applicable entity, e.g., a person, a device, an organization or any other entity for which a trust is required or sought. For example, identifying entity 830 may be a bank that wants to validate or verify the identity of target entity that may be a user, e.g., prior to completing a transaction of money to a bank account of a user based on data in a transaction request, the bank (the identifying entity) may want to verify or ascertain that the user indicated in the transaction data (the target entity) is indeed the user who owns the indicated account.

As shown, each of the (identity contact list maintaining) nodes may keep, store or include entity details and a trust level related to each detail in the contact record of the target entity. For example, assuming target entity 840 is a person, entity details 811 may include, for example, the phone number of that person as known to node 810 that may be a bank, and entity details 821 may include, for example, the home address of that person as known to node 820 that may be a medical institution. As further shown, each node may keep, store or include a trust level. For example, trust level 812 may be a number between zero and ten (0-10) that reflects or indicates the level of trust that node 810 has in the identity of target entity 840, and trust level 822 may be (possibly another) number or value that reflects or indicates the level of trust that node 820 has in the identity of target entity 840.

For the sake of clarity, only a single trust level per node is shown; however, any number of trust levels, scores or values may be associated, by each node, with an entity. For example, each element or entry in entity details 811 may be associated or assigned with a trust level, and trust level 812 may be calculated based on a set of trust levels. For example, assuming target entity is a person, entity details 811 may include the name and photo of the person with a trust link level of ten (10), e.g., reflecting a high confidence or trust level in the name since the person showed, to a clerk in a bank, an identifying card with his name and picture, and entity details 811 may include the phone number of the person with a trust level of five (5), e.g., since the phone number was obtained from a (trusted or semi-trusted) third party and was never verified. Any method may be used to calculate or determine a trust level (e.g., trust level 812) based on a set of trust levels of an entity. For example, referring to the above example, a trust level of ten in a name and five in a phone number may, e.g., based on an average, weighted average or other methods, yield a trust level of seven and half.

An embodiment may include validating an entity by obtaining, by at least one or first node or system (e.g., node 810), a set of entity details related to the entity, for example, a set of entity details related to target entity 840 as shown by entity details 811. An embodiment may include associating with the entity, by the first system or node, a respective first trust level based on at least some of the entity details. For example and as described, trust level 812 may be a trust level associated, by node 810, with target entity 840. An embodiment may include validating the entity based on the trust level. For example, to validate target entity 840, identifying entity 830 may receive, from node 810, entity details 811 and trust level 812 and may validate target entity 840 based on the entity details and the trust level. Validating an entity may be done based on entity details and trust levels from any number of nodes as further described herein. It will be understood that any method or flow for validating an entity as described herein may be performed based on, or by a collaboration of any number of nodes, e.g., nodes 810, 820 and/or any N nodes as shown by FIG. 4.

Some embodiments may include validating an entity by obtaining, by at least first and second entities, nodes or systems (e.g., nodes 810 and 820), a set of entity details related to the entity, for example, a set of entity details related to target entity 840 as shown by entity details 811 and 821. An embodiment may include associating with the entity, by the first and second systems or nodes, a respective first and second trust levels based on at least some of the entity details. For example and as described, trust levels 812 and 822 may be trust levels associated with target entity 840. An embodiment may include validating the entity based on the at least first and second trust levels. For example, to validate target entity 840, identifying entity 830 may receive, from nodes 810 and 820, entity details 811 and 821 and trust levels 812 and 822 and may validate target entity 840 based on the entity details and the trust levels.

For example, assuming target entity 840 is a person who identifies himself to another person (identifying entity 830) as John Brown, living at 17 Main Street and owning or using phone number 201-555-4444. In order to verify or validate the information provided by the person, identifying entity 830 may contact nodes 810 and 820 and query them regarding this person. Each of nodes 810 and 820 may return a set of details, e.g., name, address and phone number and a trust level that reflects the level of trust associated with the details. As described, the trust level returned by nodes 810 and 820 may be a single, global number or value, and/or it may include a set of values that reflect or represent a trust level of specific details. Based on the data returned by nodes 810 and 820, identifying entity 830 may determine or decide whether or not the person is indeed John Brown from 17 Main Street with phone number 201-555-4444. For example, if both nodes 810 and 820 inform identifying entity 830 that the above details of John are associated with a high trust level or value, then identifying entity 830 may determine that John is validated, verified or authenticated. However, if the trust level of John's details is low, either by one of nodes 810 and 820 or by combining the trust levels from nodes 810 and 820, then identifying entity 830 may determine that the identity of John is not validated and may, for example, refuse to complete a transaction or perform any other operation that may be contingent on a validation of John's identity. For example, nodes 810 and 820 may be two banks, and, before performing a transaction for a customer, identifying entity 830 (that may be a third bank) may validate the customer with banks 810 and 820 as described.

It is noted that the verification as described herein may be performed and/or achieved without using any keys or credentials provided by the target entity and/or without any centralized authentication, certification or registration authority. It is further noted that the level of trust may be increased as more and more nodes such as nodes 810 and 820 participate in a validation process as described, and, for example, dozens of nodes that keep entity details may be queried as described and any threshold may be set such that, only if sufficient nodes identify target entity 840 with sufficient trust level, then target entity 840 is validated.

In some embodiments, a record or ledger may be created for an entity by including entity details in the record or ledger, and the record or ledger may be provided to one or more nodes. For example, identifying entity 830 may be a server (e.g., server 230) that receives entity details, stores or includes the details in a record, file, ledger or any other construct and provides the record to nodes 810 and 820. Nodes 810 and 820 may each verify the details in a record, associate trust level scores to received details and/or add details to a record. For example, if a record for target entity 840 received by node 810 from identifying entity 830 includes a phone number that is verified by node 810 then node 810 may associate a high trust score or level with the phone number. Nodes may add entity details to a record received as described. For example, if a record for target entity 840 received by node 810 from identifying entity 830 (and used for creating entity details 811) includes a phone number, a social security number and a name and but does not include a home address and the home address is known to node 810 (e.g., stored in a database of node 810), then node 810 may add the home address to entity details 811. Accordingly, a record or ledger for an entity may be created or updated by any number of nodes.

In some embodiments, identifying entity 830 may periodically, or based on an event, timer or command, receive entity details from a plurality of nodes, update or create a record for an entity and distribute or redistribute the updated record to the plurality of nodes. For example, entity details that include the home address added to a record by node 810 as described may be sent to identifying entity 830, used for updating a record for target entity 840 and the updated record may be sent to node 820. Accordingly, updates/revocations of entity details from one node may be provided to other nodes thus achieving an updated and distributed ledger or record for an entity.

In some embodiments, a distributed and keyless ledger or record authentication system or method may be realized or implemented using communication-less platforms, for example, any system or platform designed to provide fully-distributed applications or data by using the features and power of cloud technology without dedicated servers, as opposed to server-based platforms. Other techniques, platforms or methods used for implementing a ledger may be or may include global inventory, public directory and public contact book.

In some embodiments, a first set of trust levels may be associated with a respective set of entity details by a first system or node, a second set of trust levels may be associated with the set of entity details by a second node, and validating the entity may be based on the first and second sets of trust levels.

For example, node 810 may associate a home address of a person (target entity 840) with a trust level of ten (10) since mail sent to that address is known to have been received by the person and node 820 may associate, with the home address, a trust level of zero (0), e.g., since this address was never used, or verified by node 820. Identifying entity may receive the sets of trust levels from nodes 810 and 820 and may use any logic to calculate a trust level in the home address and/or in the identity of the person. For example, thresholds, averaging, weights and the like may be used to determine whether or not an entity is validated, confirmed or verified based on trust levels received from a large number of nodes. For example, an entity may be considered validated or verified if none of the trust levels received from a plurality of nodes is below a threshold (e.g., below 6 out of 10), if the average trust level computed based on a plurality of trust levels is above a threshold trust level and so on.

In some embodiments, at least some of the entity details of an entity may include contact details, and an embodiment may select, based on a trust level, a first and second contact details, select, based on the first and second contact details, a respective first and second communication channels, and the embodiment may validate the entity by communicating with the entity over the first and second communication channels. In some embodiments, the first and second communication channels may be used to validate, authenticate or verify an entity as described herein, for example, by sending a first value (e.g., a generated value 126) over the first communication channel and sending a second value over the second, different communication channel, and the first and second values may be used as described herein to validate or authenticate an entity.

For example, node 810 may be an application server that may provide a first contact detail (e.g., a user name and address), and node 820 may be a server in a bank that may provide a second contact detail (e.g., a phone number or email address). The two communication channels used based on the details provided by nodes 810 and 820 may be in-band, out-of-band, logical or physical channels as described herein and contacting an entity based on two or more channels may include establishing a secured communication channel with the entity, e.g., using secret sharing as described herein.

In some embodiments, elements, entries or portions of entity details may be time-stamped, and associating an entity with a trust level may be based on time-stamps of entity details. For example, some or even each of a phone number, an address, an email and the like in entity details 811 and 821 may include or be associated with one or more timestamps that may be, or may reflect, the time the detail was created or added to entity details, the time the detail was last checked or verified and the like. A trust level determined or calculated for an entity may be based on timestamps or age of entries or details in a record or ledger. For example, data in entity details 811 that was last verified less than a week ago may be ignored, or weights may be associated with data elements in entity details 811 and 821 such that, when calculating a trust level based on data or entries in entity details 811 and 821 as described, older entries carry more weight than new or fresh entries or data. Accordingly, a trust level may be calculated with respect to age of data related to an entity.

In some embodiments, a trust level may be dynamically or otherwise updated or modified. For example, an embodiment may calculate or recalculate a trust level periodically, continuously or based on an event, a timer expiration or based on a command. For example, nodes 810 and 820 may periodically check, verify or update details, entries or data in entity details 811 and 821 and may further recalculate trust levels 812 and 822. In some embodiments, a command, e.g., received from identifying entity 830 may cause nodes to recalculate a trust level. Accordingly, a trust level for an entity may be kept up to date such that the trust level adequately reflects any changes in details or data related to the entity.

In some embodiments, updating a ledger, record or entity details may be done by each node participating in a ledger implementation described herein. For example, any one of nodes 820 or 820 may identify, receive or determine a new detail of an identity or these nodes may determine that an existing detail was changed (e.g., a phone number of a person was changed) and the nodes 820 or 820 may update entity details 811 or 821 accordingly. Updating a record, ledger or entity details of an entity may be based on any input or event, for example, a registration procedure that may include physical verification, biometric check and the like, or an update of entity details may be based on a communication via one or more of the contact addresses in the entity details, possibly using secured communication channels and/or secret shares as described herein.

In some embodiments, a trust level may be associated with a registering entity. For example, in some embodiments, entity details related to a registering entity may be received, from the registering entity and the entity details of the registering entity may be provided to one or more nodes (e.g., to nodes 810 and/or 820). The nodes provided with details of the registering entity may associate the registering entity with a trust level.

For example, a bank may register a user (e.g., target entity 840) and may provide nodes 810 and/or 820 with details identifying the bank. Nodes 810 and/or 820 may associate a trust level with the bank. For example, if the bank is known to, trusted and/or verified by node 810, then node 810 may associate a trust level of ten (10) with the bank and, if the bank is not recognized or verified by node 820, then node 820 may associate a trust level of three (3) with the bank. A trust level of, or for, a registering entity may be determined or calculated based on a set of trust levels associated with the registering entity by any number of nodes. For example, identifying entity 830 may set, determine or calculate a trust level of a registering entity based on the trust levels for the entity received from nodes 810 and 820, e.g., using logic or methods similar to those used for calculating a trust level for an entity as described herein.

Accordingly, some embodiments of the invention may prevent false registration. For example, a malicious entity attempting to steal personal information from users may lure users to register for a service, based on a low trust level associated with the malicious entity (e.g., the server or application used by the malicious entity), and some embodiments of the invention may warn the user that false registration is taking place.

In some embodiments, nodes may be provided with a reference or other information usable for verifying an entity. For example, identifying entity 830 may provide node 810 with a phone number, email address or any other data, information or reference that may be used, by node 810, to verify a person or other entity. For example, based on a request to verify a user, where the request includes a name and a phone number, identifying entity 830 may send the name and phone number to node 810 and request node 810 to verify that the phone number belongs to the user indicated by the provided name. For example, nodes 810 and 820 may be application servers (WhatsApp or Facebook servers), and thus node 810 may be able to verify a user name and messenger address of a Facebook user, node 820 may be able to verify a LinkedIn user and so on. Accordingly, by including in a system and method a plurality of nodes related to a respective plurality of platforms, social networks, institutions and so on, an embodiment may verify users or entities based on a plurality of platforms, social networks, institutions and so on.

In some embodiments, a trust level of an entity may be based on input from the entity. For example, target entity 840 may be a person and identifying entity 830 may associate a trust level with the person based on information provided (e.g., personally, in the presence of) the person. For example, a person may visit the place where identifying entity 830 (e.g., a server) is located, provide his or her fingerprints or other identifying information and, based on the provided data, identifying entity 830 may update or set a trust level for the person and/or person's entity details. A trust level and/or entity details received directly or otherwise from an entity may be sent, provided or distributed to any number of nodes. For example, a trust level established based on data provided by a user as described may be sent, from identifying entity 830 to nodes 810 and 820 and nodes 810 and 820 may update their respective trust levels and entity details based on data received from identifying entity 830.

System 800 may be, or may include, a ledger based, distributed certification. Some embodiments may create, generate or issue a certificate or proof of identity to a user.

For example, when an entity (e.g., a person) requests a certificate or proof of identity from a ledger-based, distributed certificate authority such as system 800, an embodiment may receive information from the person and may interact with the distributed ledger, possibly, referring ledger servers or nodes to the sources at which the information can be verified, e.g., links to the relevant records in the internet, until a new record with the identity of the entity is saved in (a quorum of) the distributed ledger.

For example, if or when a user requests a certification of his or her identity from identifying entity 830 or when a user registers with identifying entity 830, a unit (e.g., a unit similar to SEU 211 in a user's device or unit similar to SEU 231 in server 230) may collect information related to the user (e.g., any entity details as described) and the unit may send any collected or obtained entity details to nodes 810 and 820. Participants in a distributed certification ledger, e.g., nodes or servers in system 800 such as nodes 810 and 820 may each verify entity details received, e.g., by means that may include a physical visit of a person, establishing communication using secret sharing via different channels, third party trust, etc. and possibly grant a record, entity details or other data of the person with a trust level, score, or confidence level. Based on the scores or trust levels of a plurality of nodes, an embodiment, e.g., identifying entity 830, may grant or deny a certificate. For example, if a trust level (e.g., determined based on input from a plurality of nodes as described) for an entity requesting a certification is high, then identifying entity 830 may issue a certification for an entity, otherwise, e.g., the trust level is below a threshold, identifying entity 830 may inform the user that a certification cannot be provided.

An embodiment (e.g., identifying entity 830) may receive a request to search for (or validate) an entity and may send one or more details related to the searched entity to at least one of first and second systems or nodes. For example, identifying entity 830 may receive a request to search for, or validate an identity of a person where the request may include a name, address or other details and identifying entity 830 may send the details received to nodes 810 and 820. An embodiment may receive from the at least one of the first and second systems information including at least one of: an entity detail and a trust level related to the searched entity and the embodiment may respond, to the request, based on the information.

For example, after sending entity details of a person to nodes 810 and/or 820, identifying entity 830 may receive, from nodes 810 and/or 820, a trust level for the person and/or additional details of the person and, based on the received trust levels and data received, identifying entity 830 may determine whether or not the person was found by system 800 and/or whether or not the person is identified or validated. For example, if the person is found by one of nodes 810 or 820 (entity details that match those received from identifying entity 830 were found in a database of identity details in node 810), then that node may inform identifying entity 830 that the person was found and may send additional details for the person it found in its storage or additional details the node obtained using the details it received from identifying entity 830. In addition, each of the nodes may send to identifying entity 830 a trust level associated with the searched entity. Based on details and trust levels received from nodes in system 800, identifying entity 830 may determine whether or not the entity searched for was found, identified or verified. For example, averaging or other operations related to trust levels as well as threshold as described herein may be used, by identifying entity 830, in order to determine that a person was found and identified by system 800.

The benefits and advantages of a distributed search and validation of entities may be readily appreciated. For example, a client can search a distributed ledger (e.g., system 800) for a specific identity, possibly prior to executing a transaction in which the identity of the parties (the client and the identity holder) involved is important. During a search, one or more (possibly a majority) of the distributed ledger/quorum participants (e.g., nodes 810, 820 . . . N) may be independently contacted, and the relevant records (and trust levels), that fit the search parameters may be returned, the trust in the identification may be computed as a function of the trust in the answers from the plurality of nodes as described. A record of a searched entity may be provided, e.g., by identifying entity 830 in response to a request from a client where the record may include contact details that were provided by nodes in system 800 as described. Accordingly, provided with an initial set of details related to an entity (e.g., name and phone number) and based on details stored in a plurality of nodes, an embodiment may return a large set of details for the entity, e.g., contact information such as email address, Facebook account and the like. A client can then use contact details provided as described to send secure and authenticated messages to the searched party, e.g., by the use of secret sharing techniques as described in herein.

In some embodiments, the process of obtaining entity details (e.g., for a searched entity as described) from nodes and validating an entity as described may be automated. For example, a search engine included in nodes 810, 820 . . . N and/or in identifying entity 830 may search any server, database, service or application for information related to a searched entity and may thus obtain entity details for a searched entity. A unit, e.g., included in identifying entity 830, may be adapted to communicate with at least one of the nodes or systems in system 800 (e.g., with nodes 810 and 820) and validate an entity. For example, a unit similar to SEU 231 may receive details and trust levels from nodes 810 and 820 and may calculate, based on the received trust levels, a trust level for an entity as described. In some embodiments, a software assistant included in identifying entity 830 and/or in nodes 810 and 820 may perform the verification procedures described herein, e.g., using an automatic and/or semi-automatic contact, authorization and behavioral profile list builder and verifier.

For example, automatic, multi-factor identification and rich-contact details construction may be achieved by search engine fusion results (including indications concerning access patterns that can be extracted from public data and/or the personal behavioral patterns and preferences that servers store) in public and private directories, social networks, government, and commercial entities is a proposed software application. A contact list or rich-contact details as described herein may facilitate the use of secret sharing and overlay security to establish multi-channel, multi-factor, identification, authentication, and secrecy as described herein.

As described, the need to identify a person, a company, or even a device in the IoT era in the information age may be facilitated, by some embodiments, by gathering information concerning the person/company/device, e.g., by nodes 810 and 820, from the internet and other official/non-official governmental/private lists and investigators, such as phone books, election lists, or specialized (on-line/off-line) investigation services.

In some embodiments, an automatic and/or semi-automatic contact, authorization and behavioral profile contact and identity record builder and verifier (e.g., included in identifying entity 830) may be an unsupervised (e.g., using capabilities such as face recognition in images) process or supervised, possibly presenting found photos or other-identifications details and their sources interacting with the owner or user of a rich-contacts data-base letting the owner or user choose the most probable details to be fused into a ledger, record or entity details as described herein. Any source may be accessed, e.g., by units in identifying entity 830 or nodes 810 and 820, that may use results of search engines such as google (images), Facebook, Linkedin, Skype presenting all relevant photos or other details to be selectively chosen for gathering reliable contact information. For example, identifying entity 830 may present to a user data found for the user, receive from the user an indication that the information is correct and/or that the information should be included in entity details for the user. After receiving a confirmation from a user that information found for the user is correct or approved, identifying entity 830 may include the information in entity details for the user and may distribute the entity details, e.g., by sending entity details to nodes 810 and 820. Accordingly, a distributed record may be established by updating a plurality of nodes.

In some embodiments, in order for a trust level to be determined, entity details obtained from a plurality of sources may be cross-checked. For example, a detail such as a phone number for an entity provided by node 810 may be compared with a phone number for the entity provided by node 820. Accordingly, a trust level for a detail may be set or updated based on cross-checking the detail or based on the number of nodes or sources that confirm the detail. Verification of details related to an entity may include an active event driven verification of the details (e.g., contact information) may be performed, e.g., by identifying entity 830. For example, identifying entity 830 may contact an entity with secret sharing through several communication links, to verify that the entity is reached using the different physical (e.g., WiFi, Cellular, Bluetooth) or logical (e.g., VPNs, messaging service) communication paths to enable the entity to store personal information, such as password/token and personal questions in a record or contact list or to set or update the trust level or confidence in the identity of a user.

In some embodiments, verification of the obtained details may be a continuous or never-ending process, where an automatic user record, entity details or contact list builder is periodically (and/or event driven on demand triggered) invoked to (re)gain confidence on details in the contact list.

In some embodiments, a device may be associated or linked with an entity based on receiving, from at least one node or system, a confirmation that a current activity of the entity is related to the device. For example, node 810 may be a Facebook server that may verify and confirm that a specific user is currently using a specific device to access his or her account in Facebook, and, based on such confirmation, identifying entity 830 may associate the specific user with the specific device, e.g., include details of the specific device in entity details of the user.

In some embodiments, at least some of the entity details of an entity may include contact details for contacting the entity over at least two platforms and, validating the entity may include contacting the entity using the at least at least two platforms. For example, entity details 821 may include credentials for a Facebook account (e.g., user name) and entity details 811 may include a phone number of the user. Using such contact information (possibly received from more than one nodes in a system), identifying entity 830 may, for example, contact the user using SMS (using the phone number received from node 810) and using the user's Facebook account (received from node 820).

In some embodiments, a verification of an entity or user or updating entity details of the entity may include linking the user to a (possibly new) device where contact details are kept by, or originate from, third parties (e.g., LinkedIn or Facebook) that may be used to identify a user. For example, a user may direct or allow the third parties to "testify" that they link his/her identity to a current activity on the new device, and an embodiment may augment the new device parameters into a record or entity details of the user. Mutual trust parameters among the third parties may be used to calculate a certainty or trust level for the user.

Privacy protection may be achieved by some embodiments by sending secret shared data with integrity checksum to a user. For example, a user or client that would like to identify herself/himself may present a random string (for certain fields that should be revealed) that when used in a particular fashion, say twice (e.g. concatenated) reveals the needed information and the fitting signature.

In current or known system and methods, enrollment of a device to a server is typically done by a user account that is known to the server, e.g. email account. Usually, there is some information that is sent to this account and the user has to type this information in the server application. The enrollment process is typically performed each time the user adds/changes a device. An attacker can use this enrollment process as a vulnerability and try to add another device to a specific user account and by cracking its mail account, it can gain the needed information to successfully enroll its own device to the victim account.

In one embodiment of the invention, using an enrollment process as described, the first time a user enrolls with a server, the user logs in through the server application to his email account (or other identification account(s)), and, if this login is successful, the enrollment process is also completed successfully. Accordingly, the inconvenience of typing the data that is sent from the server is eliminated.

In some embodiments, in addition to a mail login, a user may be requested to log in through several accounts in several nodes, e.g., through accounts in nodes 810 and 820 that may be LinkedIn or Facebook servers. Trust levels of the additional nodes as described may be used as input to an overall trust gained for the user or user's entity details as described. For example, identifying entity 830 may get tokens or credentials of the several user accounts and may ask the accounts servers, e.g., Facebook, to give it the details of the account owner. Identifying entity 830 may save the details of the user (e.g., the user id in the specific server) of its several accounts and when the user logins using another device, identifying entity 830 may ask or prompt the user to login through his or her accounts and identifying entity 830 may verify the details. Copies of the tokens or credentials may be saved in a distributed identity certificate authority (e.g., system 800), thus enhancing the trust in the identification of an entity.

In some embodiments, nodes in a system (e.g., nodes 810 and 820) may use consensus to establish common identity storage (e.g., removing obsolete information) and combined trust, upon a read/search/write event and/or periodically. In some embodiments, nodes (e.g., nodes 810 and 820) may periodically perform search for their identity to avoid identity theft, and may have (periodically, e.g., daily, monthly) search, read, write or update identity details or records. In some embodiments, a ledger (or identity-ledger) maybe implemented by the use of a distributed ledger based on block-chain technology such as Ethereum.

As described herein, in order for an entity to be identified (or be registered or enrolled), an embodiment may send one or more values to the entity via respective one or entities or devices. In some embodiments, the one or more entities or devices via which values are sent to the entity that is to be identified may be selected based on a distributed ledger as described herein. For example, identifying entity 710 may select entities 720 and 730 (for sending values to entity 740) based on entity details of entity 740. For example, a record (or entity details in a record) of entity 740 may include data and/or references to family members or friends (entities 720 and 730) of a user (entity 740) that can testify that the entity details of entity 740 are correct and/or that can be securely used to transfer values to entity 740. Accordingly, a method of identifying an entity as described herein may include selecting intermediate entities for transferring or providing values to the entity based on a distributed ledger as described herein.

Some embodiments of the invention may provide and/or enable a quantum safe secured communication infrastructure using a distributed ledger, authentication overlay techniques and secret sharing as described herein. In particular, embodiments that are not based on the unproven existence of one-way-function, that are computationally weak for quantum computers, such as discrete log and factorization, but are based on proven information theoretically secure methods and combinatorics. For example, a system and method that use a keyless authentication and/or identification scheme as described herein augmented by secret sharing and secure communication channels establishment techniques as described herein and further including identification of an entity using one or more intermediate nodes or entities as described may provide or enable an infrastructure that is secured to a degree that far exceeds any other or known infrastructure.

In some embodiments, a method, procedure or sequence of operations may include, or be related to, a registration of an entity, e.g., a registration to a service, an enrollment to a server or application and the like. A registration of an entity may include any one or more of creating, verifying, authenticating, validating and/or storing entity details or records.

For example, in some embodiments, in order for an entity to be to registered, a set of semi-trusted nodes (e.g., one or more banks, social platforms and servers) may each, independently, verify the identity of the entity and grant a confidence level to a copy of at least some entity details of the entity that may be stored by the node. For example, identifying entity 830 may be a server that may provide each of nodes 810, 820 . . . N a record or other entity details of an entity and each of nodes 810, 820 . . . N may, independently, use a record received from identifying entity 830 to verify the identity of the entity, associate a confidence or trust level with a copy of the record that may be stored by the node.

For example, a record (or identity record) may include any identity details or attributes as described (e.g., photo, contact information, biometric information, passwords, public-keys, credit history, credit numbers and the like).

Nodes 810, 820 . . . N may use any consensus to establish common or synchronized identity storage and/or combined trust, for example, nodes 810, 820 . . . N may update each other such that obsolete entity details may be removed from all of 810, 820 . . . N. For example, if node 810 learns that a phone number of a user is no longer valid, then node 810 may inform node 820 of such change, and node 820 may update its copy of entity details accordingly. Any operation performed by nodes 810, 820 . . . N, target entity 840 and/or identifying entity 830 may be performed, for example, by a dedicated unit in these nodes, e.g., an SEU as described herein. Verifying, updating or synchronizing entity details may be done periodically, e.g., based on a timer, or based on an event, e.g., every time entity details change.

In some embodiments, a method, procedure or sequence of operations may include, or be related to searching for and/or providing records or entity details by a searching entity-engine that may create a record for the entity to be (verified and) stored in the (typically distributed) identity authority. Later, the stored and verified entity record (or field of the record) may be requested, received or read, by a user or a node (e.g., identifying entity 830).

Records or entity details may be obtained from each of nodes 810, 820 . . . N, possibly after gaining authorization from the node or identity holder, e.g., an authorization may be provided by cryptographic approval mechanism or method, e.g., a mechanism or flow involving a one-time pad (OTP) as described herein.

A reader, requestor or receiver of an entity's details may establish trust in the identity and its history using a function of the confidence or trust levels in answers or responses received from the responding nodes.

Identity (or entity details) holders (e.g., nodes 810 and 820) may periodically perform search, update or verification for information they hold e.g., to avoid identity theft, and they may (periodically, e.g., daily, monthly) search/read/write/update report on their identity record. For example, nodes 810 and 820 may periodically validate or verify that the entity details they store are valid or correct and may inform each other and/or identifying entity 830 of the validity of entity details they store.

Fees for creating/maintaining a record or entity details may be handled by a server (e.g., identifying entity 830) as a paid to (distribute) identity authority. A server (e.g., identifying entity 830) may facilitate record write, possibly checking the trust in it by further greater means than those described herein.

A server (e.g., identifying entity 830) may check the authorization for search and reads, possibly checking such requests in further greater means. One or more servers (e.g., a plurality of identifying entities 830) may provide or enable worldwide presence and may participate in any interaction while other nodes may only join the quorum.

Some embodiments of the invention may include verifying, validating and/or authenticating the identity of an entity (target entity) by securely sharing a public encryption key with the target entity. Generally, verifying, validating and/or authenticating an identity may include producing evidence, or otherwise making sure that an entity with which digital communication is attempted is indeed the entity that responds to the attempted communication. In other cases, verifying, validating and/or authenticating an identity may include producing evidence, or otherwise making sure that a trust of, or communication with, a specific or known entity have been established. For example, reception of data encrypted using a public key provided as described may be, or may be regarded as, validation, authentication and/or verification of the entity that sent the encrypted data.

For the sake of simplicity, the first or identifying entity may be referred to herein as IE 830 (in view of identifying entity 830 in FIG. 4) and the second, target entity, may be referred to herein as TE 840 (in view of target entity 840 in FIG. 4).

Figure 5:
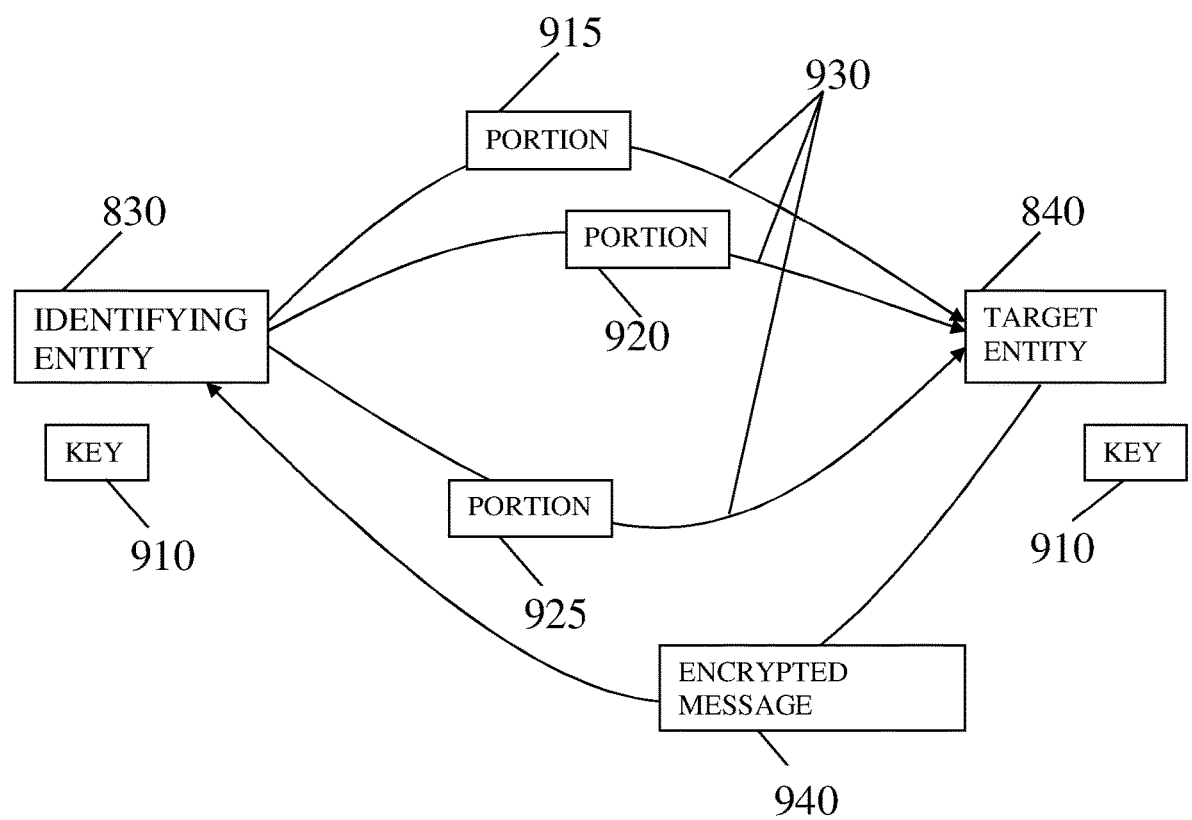
FIG. 5 shows a system and flows according to illustrative embodiments of the present invention.

Reference is made to FIG. 5 which illustrates a flow of validating an entity according to some embodiments. For example and as shown, to validate TE 840, IE 830 generates or obtains a key 910 that may be any numerical value that is used to encrypt data. For example, key 910 may be an encryption public key. IE 830 may further divide the public key into portions 915, 920 and 925. For example, when combined, the three portions or data objects 915, 920 and 925 constitute key 910. For example, if the public key is three bytes long, then a first portion 915 may be a first byte that includes the value of the first byte of the public key, a second portion 920 may be a second byte that includes the value of the second byte of the public key, and so on. The set of portions may then be included in a respective set of shares that may be sent, to TE 840, over a respective set of communication channels 930. The set of communication channels 930 may include different channels, e.g., different physical and/or logical channels as described, accordingly, an adversary that does not capture all portions (or shares) sent from an identifying entity to a target entity as described cannot reconstruct the public key and thus cannot impersonate the target entity.

Having received the set of portions, TE 840 may use data in the shares to reconstruct the key 910 and may then use the public key to encrypt some predefined data and send the encrypted data to IE 830, e.g., as shown by encrypted message 940 sent from TE 840 to IE 830. For example, some code, value or even a string of characters may be known to, or agreed on by, IE 840 and TE 830 and, having reconstructed the public key as described, TE 840 may use the public key to encrypt the code, value or string of characters to produce encrypted data and may send (or otherwise provide) the encrypted data to IE 830 as shown by message 940. Based on matching the encrypted data with expected data (e.g., comparing data received from the target entity to an expected data and determining they are the same), IE 830 may validate TE 840. For example, reception of an expected code, value or string of characters (encrypted using the public key provided as described), IE 830 and from TE 840 may serve as proof that TE 840 is indeed the entity that IE 830 sought to validate or authenticate.

In some embodiments, instead of using data known to, or agreed on by, the identifying and target entities as described, validation or verification data may be included in shares transmitted over established, possibly logical, channels, e.g., in shares similar to those used for communicating the public key as described. For example, in addition to portions of the public key, shares sent from IE 830 to TE 840 as described may include a code, value or string of characters and IE 830 may use the public key to encrypt the code, value or string of characters and send the encrypted code or value TE 840, and, accordingly, expected data as described may be data sent from an identifying entity to a target entity that is to be validated or verified.

In some embodiments, a subset of the shares is enough for reconstructing the public key. For example, IE 830 may send more portions of a public key then required in order to reconstruct the key possibly over, probably logical, different communication channels or, in other cases, information in a subset of the portions may suffice to reconstruct the key.

In some embodiments, reconstructing the public key may be done based on the largest number of subsets of the shares that produce the same public key. For example, TE 840 may receive a set of five shares and may iteratively use some or even all possible subsets of the five shares to reconstruct the public key. For example, other than reconstructing the key based on the five shares, TE 830 may reconstruct five additional keys based on the five different subsets of only four shares; similarly, TE 830 may use subsets of only three shares and of only two shares. The key produced based on the largest number of shares may be determined to be the correct key. Accordingly, an embodiment may enable reconstruction of an encryption key (or any other secret) even in the presence of errors and/or an adversary that modifies data communicated between IE 830 and TE 840.

It will be understood that the roles of IE 840 and TE 830 may be reversed, e.g., TE 830 may verify or validate IE 830 as described herein. For example, in some embodiments, possibly after IE 830 has validated TE 840, TE 840 may initiate a process or flow in the reverse direction, e.g., TE 840 may send shares of a public encryption key to IE 830 over several communication channels, and TE 840 may validate IE 830 based on reception of data encrypted by the public key.

Validating an entity as described may be performed periodically, repeatedly and/or based on an event. For example, IE 830 may generate and use a new or different public key to authenticate (or reauthenticate) TE 840 once a day, every hour, every ten minutes and so on. In other cases, an event such as lack of communication for more than a predefined time interval (e.g., five minutes, two hours etc.) may cause IE 830 to authenticate or reauthenticate TE 840 possibly using a fresh public key that has not been previously used. Another event that may cause IE 830 to authenticate TE 840 using a newly generated public key may be an attempt to establish a communication channel (e.g., establish a TCP connection or communication channel) between IE 830 and TE 840.

In some embodiments, a sequence of bits may be provided to a first and second entities (e.g., to IE 830 and to TE 840) such that both entities each possess or have an object that includes the same, identical sequence of bits (bit sequence).

The sequence of bits (or bit sequence) may be, may form, or may be used as a shared, OTP. In cryptography, an OTP is an encryption technique that cannot be cracked, but requires the use of a one-time pre-shared key. For example, clear text 1060 described herein may be paired with a portion of a bit sequence (e.g., in content object or bit sequence 1000 described herein) that may be used as a secret key.

The sequence of bits may be of any size, e.g., it may be, or may include, 128 giga bytes (gigabytes or GB) of data that may be random, e.g., produced using a random number or random data generator as known in the art. Portions in specific offsets in the sequence of bits may be used to manipulate data. For example, embodiments may use a first portion of the bit sequence (starting at a first offset in the bit sequence) in order to XOR input data, and embodiments may use a second portion of the bit sequence (starting at a second offset in the bit sequence) as an encryption for encrypting data.

Figure 6A:
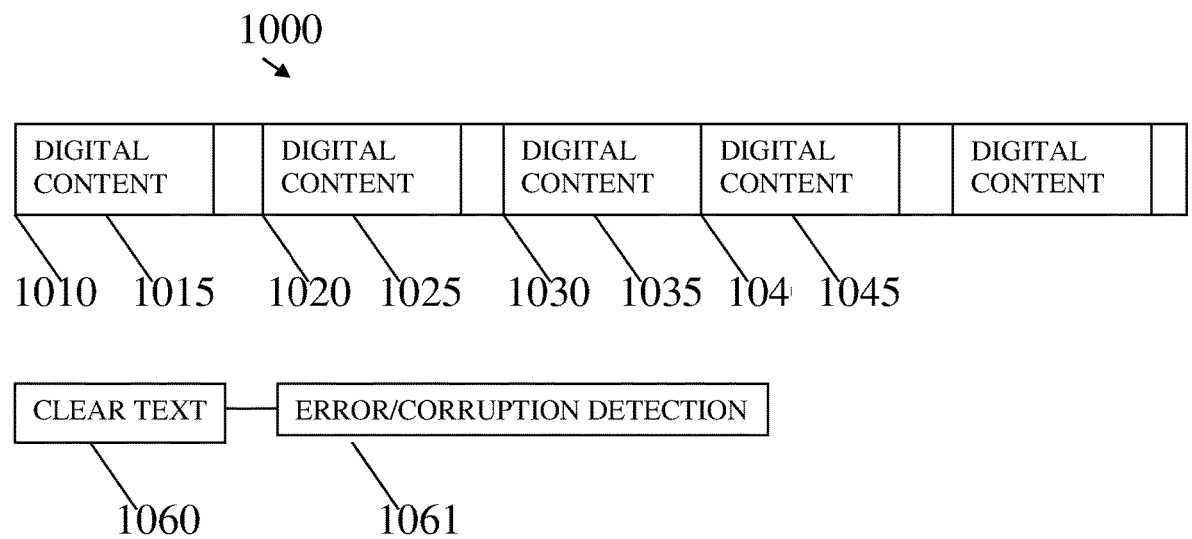
FIG. 6A shows offsets and portions in a data object according to illustrative embodiments of the present invention.

Reference is made to FIG. 6A which shows portions and offsets in a bit sequence as well as other data according to embodiments of the invention. As shown, bit sequence 1000 that may be provided to IE 830 and to TE 840 may include portions 1015, 1025, 1035 and 1045 that start at respective offsets 1010, 1020, 1030 and 1040. The size of portions 1015, 1025, 1035 and 1045 may be fixed or same or it may be different for different portions, e.g., portion 1025 may be or may include 512 bytes and portion 1035 may be or may include 1024 bytes. Clear text 1060 may be any text in digital form (e.g., a string of bytes or characters). For example, clear text may be a string of bytes that represents or encodes, e.g., in American Standard Code for Information Interchange (ASCII), the words "Good morning". Error and/or corruption detection data 1061 may be, for example, a hash value calculated based on clear text 1060. For example, a specific hash value calculated for "Good morning" can be used to verify or validate that text in a received message is indeed "Good morning" and/or used to ascertain that the message was received intact, uncorrupted and/or with no errors.

In some embodiments, prior to the encrypting and XORing a message (e.g., clear text 1060, error/corruption detection information 1061 may be included in the data or message such that the encrypted and/or XORed message (e.g., sent from IE 830 to TE 840) includes the original message and the error/corruption correction information 1061. For example, a receiver of a message can verify that the message is intact by calculating a hash value for a received message and compare the calculated hash value to a hash value included in the message, and, if the two hash values are the same (they match), then it may be assumed the message was received intact, with no errors. However, if the hash value calculated by a receiver is different from the hash value in a message, then the receiver may determine that an error occurred (or an adversary has modified the message), and the message received is not exactly as sent.

In order for a message to be securely sent to a second entity (e.g., to TE 840), a first entity (e.g., IE 830) may encrypt data (e.g., clear text 1060) using bits in a first portion of a bit sequence as an encryption key, thus producing encrypted data. For example, IE 830 may encrypt clear text 1060 using content 1015 at offset 1010.

IE 830 may further apply exclusive OR (XOR) to the encrypted data based on, or using, bits in a second portion of a bit sequence to produce encrypted and XORed data. Accordingly, IE 830 may produce encrypted and XORed data. For example, IE 830 uses bits in content 1035 (starting at offset 1030) to XOR encrypted data that was produced using content 1015.

As known in the art, XOR is an operation or function that produces true (e.g., "1") if the number of true inputs is odd. XORing encrypted data based on, or using, bits in a second portion of a bit sequence may include producing an object or bit sequence in which each bit is the result of XORing the (offset wise) respective bits in the encrypted data and portion of the bit sequence. The encrypted and XORed data may be sent to a second entity. For example, IE 830 may send the encrypted and XORed data to TE 840.

Using the sequence of bits, the second (receiving) entity, may un-XOR and decrypt the encrypted and XORed data. For example, as described, both IE 830 and TE 840 may have, include or possess bit sequence 1000, accordingly, after receiving the encrypted and XORed data from IE 830, TE 840 may use content 1035 to un-XOR the received data and TE 840 may further use content 1015 to decrypt the un-XORed data thus producing the original data, e.g., clear text 1060 or any other data.

The operations of encrypting and XORing as described may be performed or applied any number of times and at any sequence. For example, prior to encrypting data using bits in a first portion of a bit sequence as an encryption key as described, IE 830 may XOR the data using bits in a third portion of the bit sequence, thus processing data according to the sequence of XOR, encrypt, XOR; however, any other sequence may be used, e.g., XOR (using a first portion of 1000), XOR (using a second portion of 1000), encrypt (using a third portion of 1000) and XOR (using a fourth portion of 1000). A specific sequence or set of operations (e.g., XOR and encrypt) and the relevant offsets in content object 1000 may be known to IE 830 and TE 840, and, accordingly, any sequence may be used since, using an agreed upon sequence, TE 840 can undo or reveres any set of operations performed or applied by IE 830. It is noted that the combination of content 1000 that is unknown to an adversary, and the type of operations or manipulations of data performed based on content 1000 that are also unknown to the adversary and the further, unknown to the adversary, order or sequence of the operations or manipulations provide a perfect information theoretically secure level of security and authenticity.

In some embodiments, first and second entities (e.g., IE 830 and TE 840) may be provided with an identical sequence of bits (e.g., content object 1000 that may be stored in systems 1070 connected to IE 830 and TE 840). The first and second entities may use the identical sequence of bits XOR and/or encrypt data before sending it. Any sequence of XOR and/or encryption operations may be performed on data prior to sending it. For example, before sending data to TE 840, IE 830 may XOR clear text 1060 using bits in offset 1020 of object 1000 to produce XORed data and then (again) XOR the XORed data using bits in offset 1040 to produce XORed$^2$ data and then encrypt the XORed$^2$ data using bits in offset 1020 as an encryption key. Accordingly, it will be understood that the scope of the invention is not limited by the number and/or order of XOR and encryption operations applied to data as described. Of course, the receiving entity may apply a reversed sequence of operations to produce the original data. For example, in the above example, TE 840 may decrypt data in a message received from IE 830 to produce XORed$^2$ data, un-XOR the XORed$^2$ data to produce XORed data and un-XOR the XORed data to produce clear text 1060. In particular, the data may not be XORed and/or the outcome of the, e.g., AES symmetric encryption may not be XORed. Here the usage of the AES encryption eliminates the revealing of the random sequence used, revealing easily obtained by XORing the input to, and output from, the entity if only XOR is used.

Any logic, rule or predefined list may be used, e.g., by IE 830 and TE 840 to select offsets and size in content object 1000 for the encrypting and XORing operations. For example, if prior to being sent, clear text 1060 is XORed, then encrypted and then XORed again using respective three different offsets and number of bits in content object 1000 then IE 830 and TE 840 may each maintain three pointers that are used for reading the relevant bits and, after reading the bits, IE 830 and TE 840 may advance the pointers such that when a next, new or additional message is to be sent, different bits in content object 1000 are used. For example, a first message may be XORed based on bits in content 1015 (offset 0), encrypted using bits in content 1035 (offset 3,072), and XORed again using bits in content 1025 (offset 1,024), the next message may be XORed using bits in offset 6,144, XORed using bits in offset 9,216 and so on. The logic according to which offsets (or content portions) in content object 1000 are selected may be a secret known only to IE 830 and TE 840.

In some embodiments, the offsets used for selecting data in content object 1000 are advanced periodically or based on an event. For example, IE 830 and TE 840 may advance the offsets used for each new session, once a day or in case an error is identified e.g., data sent by IE 830 is not correctly received by TE 840. Any other event or logic may be used to synchronously and/or automatically advanced offsets (e.g., by advancing or incrementing pointers) by a first and second entities, e.g., IE 830 and TE 840, such that the offsets are synchronized and usable as described over any period of time and/or practically any number of communications or messages.

Validation of IE 830 may be performed or determined by TE 840 based on matching received data with data in the sequence of bits. For example, rather than sending clear text 1060 or any other text, IE 830 may send data as in some (known to TE 840) offset of content object 1000, accordingly, TE 840 can validate that the message was indeed sent by IE 830 by comparing the content of the message to the (known) offset. Accordingly, some embodiments of the invention provide a two-way validation or authentication scheme.

Figure 6B:
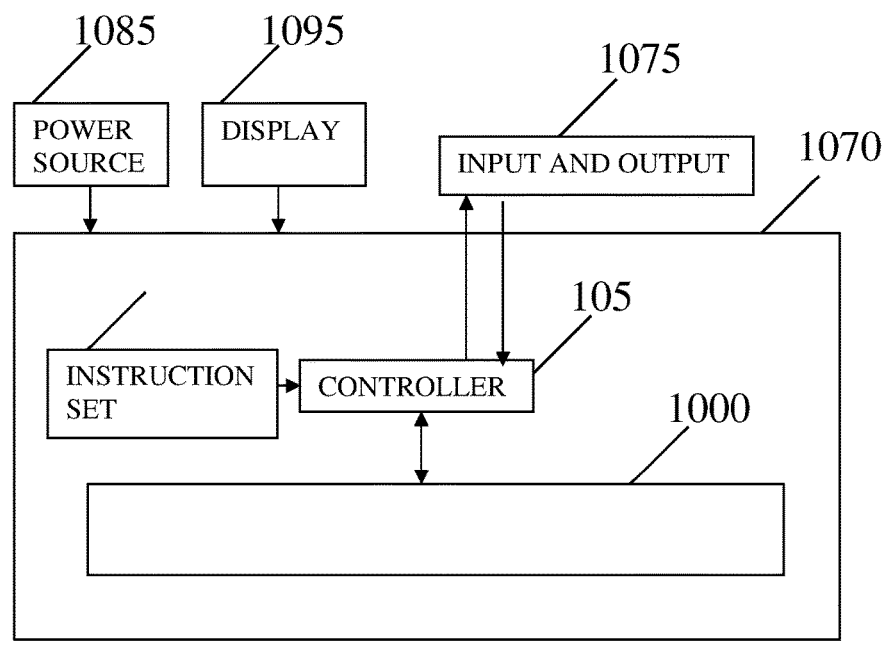
FIG. 6B shows a system according to illustrative embodiments of the present invention.

Some embodiments may include a hardware component, device or system. Reference is made to FIG. 6B showing a system 1070 according to some embodiments of the invention. As shown, system 1070 may include content object 1000 e.g., stored on a flash or other storage device or memory. As further shown, system 1070 may include a controller 105, an instruction set 1080 that may be similar to executable code 125, a power source 1085 that may be a battery or may usable for connecting an external power source and system 1070 may include an interface 1075 for receiving input and providing output.

As further shown, system 1070 may include a display 1095 (e.g., a liquid crystal display (LCD)) that may be used, for example, to prompt a user to verify, authenticate and/or confirm any one of encrypting, XORing and sending data as further described herein. For example, prior to encrypting or XORing data, controller 105 may use display 1095 to prompt a user to provide his or her biometric input, such as a finger print (e.g., using a suitable component included in I/O 1075), prompt the user to enter a password using I/O 1075 and the like. Accordingly, reception of data XORed and/or encrypted as described herein may be, proof, evidence or for determining that, the user has approved the data sent. For example, clear text 1060 may include an order to transfer money and reception of a message that includes the XORed and encrypted transfer order may be used as proof or evidence that the user has indeed confirmed the transfer.

In some embodiments, content object 1000 and/or system 1070 may be, or may be included in, a user's computing device or communication device. For example, system 1070 may be, or may be included in, a smartphone, a laptop, a mobile communication device or any other suitable device. For example, a display or touchscreen of a smartphone may be used for presenting clear text 1060 to a user and a biometric input unit (e.g., a fingerprint sensor or scanner) included in the smartphone (that also includes content object or bit sequence 1000) may be used for receiving confirmation or approval from a user, e.g., prior to sending encrypted and/or XORed data as described, a fingerprint sensor or scanner of a smartphone may be used for receiving confirmation or approval from a user and the confirmation may be used as evidence or proof as described.

Instruction set 1080 may include a restricted set of operations. For example, instruction set 1080 may cause controller 105 to perform operation selected from the group consisting of: XORing data, encrypting data and decrypting data, based on portions of bit sequence 1000. Instruction set 1080 may cause controller 105 to prevent reading data from content object 1000 and prevent writing data to content object 1000. Accordingly, system 1070 may fully protect content object 1000 from being read from and/or written to. Otherwise described, system 1070 may be provided as a black box that performs various operations. For example, in some embodiments, system 1070 receives, as input, encrypted and/or XORed messages and provides as output clear text. For example, system 1070 may receive encrypted and XORed data, e.g., produced by IE 830 as described, may un-XOR and decrypt the encrypted and XORed data using offsets in content object 1000 as described and provide, as output, clear text 1060. In some embodiments, system 1070 receives encrypted and XORed data, validates the sender as described (e.g., by comparing content in a message to content in content object 1000) and provides, as input, an indication of whether or not the sender is validated.

System 1070 may perform any operation described herein with respect to IE 830 and/or TE 840. For example, provided as, or included in, a detachable device, system 1070 may be connected to a user's computer or laptop and may generate messages as described with reference to IE 830 and/or system 1070, when connected to, or included in, a user's computing device, may receive and process messages as described with reference to TE 840.

Some embodiments provide proof of signature. For example, prior to encrypting data as described, an embodiment may prompt a user to sign or confirm a message, an embodiment may encrypt the data only if a signature or confirmation is received, accordingly, encryption of data may serve as proof of signature or confirmation from a user.

Bit sequence 1000 may be provided to first and second entities, e.g., to IE 830 and to TE 840 by physically connecting systems 1070 to two computing devices. In some embodiments, bit sequence 1000 may be randomly generated and securely sent to first and second entities. For example, to generate, create or produce content object 1000, an embodiment (e.g., system 1070) may produce a random sequence of bits, e.g., using a random number generator or a random content generator. An embodiment may further use a public key to generate and/or exchange between parties a symmetric key and use the symmetric key to encrypt the random sequence of bits to thus produce an encrypted sequence of bits. The encrypted sequence of bits may be provided to the parties (e.g., to IE 830 and to TE 840). The parties (e.g., IE 830 and TE 840) may then each produce the same, identical by decrypting the encrypted sequence of bits using the symmetric key. In some embodiments, encrypting as described is performed using a quantum safe cryptosystem or method such as the cryptosystem based on the McEliece scheme.

Figure 7:
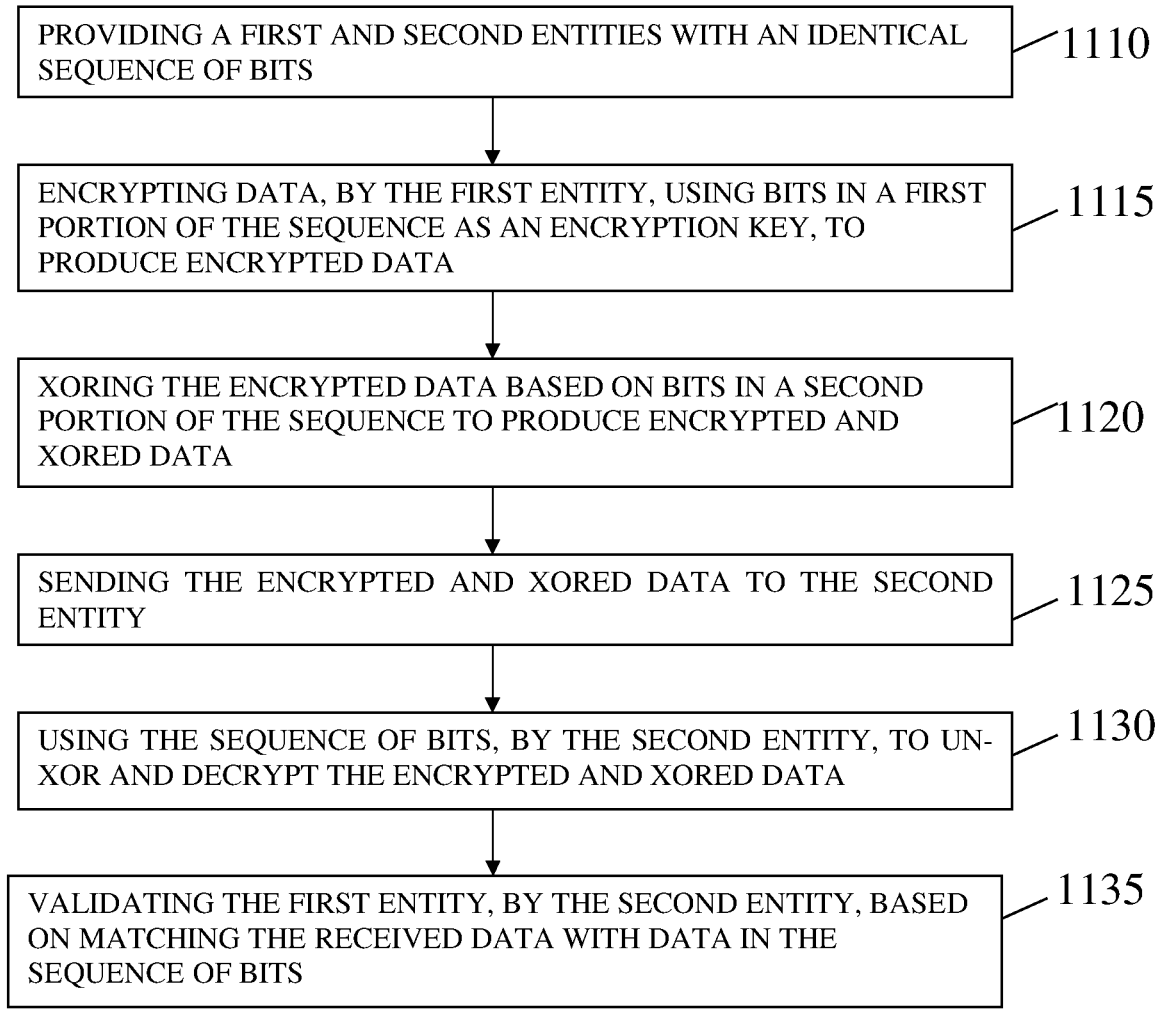
FIG. 7 shows a flow chart of a method according to illustrative embodiments of the present invention.

Reference is made to FIG. 7, a flowchart of a method of securing a communication channel and/or authenticating a device according to illustrative embodiments of the present invention. As shown by block 1110, first and second entities may be provided with an identical sequence of bits. For example, systems 1070 that include same or identical bit sequence 1000 may be connected to two or more devices. In other cases and as described, the same or identical bit sequence 1000 may be provided to two entities over a secured communication network protocol or logical and/or physical channel.

As shown by block 1115, data may be encrypted, by the first entity, using bits in a first portion of the sequence as an encryption key, to produce encrypted data. As shown by block 1120, the encrypted data may be XORed using, or based on, bits in a second portion of the bit sequence to produce encrypted and XORed data. For example, IE 830 may use digital content 1035 in offset 1030 for XORing encrypted data produced as described in block 1115.

As shown by block 1125, the encrypted and XORed data may be sent to the second entity. For example, IE 830 may send encrypted and XORed data to TE 840. As shown by block 1130, the second (receiving) entity may use the sequence of bits to un-XOR and decrypt the encrypted and XORed data. For example, TE 840 may un-XOR data received from IE 830 using digital content 1035 in offset 1030 and further decrypt the un-XORed data using digital content 1015 in offset 1010 as a decryption key.

As shown by block 1135, the first entity may be validated, verified or authenticated, by the second entity, based on matching the received data with data in the sequence of bits. For example, rather than encrypting and XORing clear text 1060 as described, IE 830 may encrypt and XOR data in digital content 1045 at offset 1040. Accordingly, if TE 840, after un-XORing and decrypting data to produce original data as described determines that the original data matches, or is identical to, data in digital content 1045 at offset 1040, then TE 840 may determine that the sender of the data is indeed validated, verified or authenticated, e.g., the sender is indeed IE 830 and not an adversary disguised as, or impersonating, IE 830. In yet other embodiments, a specific original data may be known to, or agreed upon in advance, e.g., IE 830 and TE 840 may each store or include the same clear text 1060; thus, if after un-XORing and decrypting data in a message the resulting data matches, or is identical to clear text 1060, then validation, verification or authentication may be determined as described.

Advantages provided and/or enabled by embodiments of the invention may be readily appreciated by a person having ordinary skill in the art. For example, embodiments of the invention enable transmitting a self-produced public key in the form, or using, portions or shares as described such that an eavesdropper does not gain anything from, or by capturing, some of the portions or shares. For example, a public key divided into shares and shared by entities by sending the shares over a plurality of channels as described cannot be reconstructed by an eavesdropper who does not obtain all the shares. An additional advantage is the ability of a sender to identify and/or validate the identity of a receiver based on the ability of the receiver to reconstruct the public key. Yet another advantage is the identification or validation of an entity (e.g., a receiver of the public key shared as described) based on the ability of the receiver to encrypt a message using the public key.

By providing an identical long file with random bits, e.g., bit sequence 1000 described herein, embodiments of the invention provide an advantageous method of securely communicating a message or data by using portions of the file or bit sequence to authenticate and/or sign a message. An additional security measure may be added by securely sharing the bit sequence, e.g., by dividing a randomly generated bit sequence into shares or portions and sending (or sharing) the shares or portions by sending them over a plurality of different communication channels as described.

Using random bits in a bit sequence as described provides a security that cannot be achieved by any known system or method, specifically, embodiments of the invention are far superior to any computationally challenged security measures since both an encryption key used and XORing of data as described are based on random bits. For example, using a portion of a random bit sequence as an AES encryption/decryption key for encrypting the message avoids or eliminates the computation related security of AES, similarly, XORing or bit-wising a message using a random set of bits, e.g., before and/or after an AES encryption is a novel encryption method that is also perfectly information theoretically secure.

An additional advantage is the signing of a message that may be used as a verification and/or proof of consent or approval. For example, as described, system 1070 uses an LCD or other display to show a message (e.g., clear text 1060), prompt a user to authenticate or approve sending a message, e.g., by entering a password/pin-code or providing biometric data and, if the user provides expected input, system 1070 encrypts and/or XORes the message and sends the encrypted and/or XORed message as described. Reception of a correctly encrypted and/or XORed message may consequently be regarded as a signature or otherwise be proof that the user indeed sent the message and approves the message's content.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of validating a device or an entity, the method comprising:

sending, by a first computing device to a second computing device, over a first communication channel, at least a first data share including a first portion of an encryption key;

sending, by the first computer device to the second computing device, over a second communication channel, at least a second data share including a second portion of the encryption key, wherein the second communication channel is different from the first communication channel, the second data share is different from the first data share, and the second portion of the encryption key is different from the first portion of the encryption key;

providing the first computing device and the second computing device with an identical sequence of bits, wherein the identical sequence of bits is provided on a hardware storage system that:
  enables an operation selected from the group consisting of XORing data, encrypting data, and decrypting data, based on portions of the identical sequence of bits, and
  enables preventing reading data from the storage system or writing data to the storage system;
using, by the second computing device, the first data share and the second data share to reconstruct the encryption key;
using the encryption key, by the second computing device, to encrypt at least one of predefined data and data generated based on information included in the first data share and the second data share;
sending the encrypted data to the first computing device; and
validating at least one of the second computing device and an entity associated with the second computing device, by the first computing device, based on at least one of:
  matching the received encrypted data with data included in the data shares,
  matching the received data with data in the identical sequence of bits, and
  matching the received data with the predefined data.

2. The method of claim 1, wherein a subset of a plurality of data shares is sufficient to reconstruct the encryption key.

3. The method of claim 2, wherein reconstructing the encryption key is done based on the largest subset of a plurality of data shares that produces the same encryption key.

4. The method of claim 1, further comprising reversing the roles of the first computing device and the second computing device.

5. The method of claim 1, further comprising repeatedly validating at least one of: the second computing device and the entity using a different encryption keys.

6. The method of claim 1, wherein providing the sequence of bits includes:
  producing a random sequence of bits;
  using the encryption key to generate a symmetric key;
  encrypting the random sequence of bits using the symmetric key to produce an encrypted sequence of bits;
  providing the encrypted sequence of bits to at least one of the first computing device and the second computing device; and
  producing the identical sequence of bits, by the at least one of the first computing device and the second computing device, by decrypting the encrypted sequence of bits.

7. The method of claim 1, wherein the encrypting is performed using a quantum safe cryptosystem or method.

8. The method of claim 1, further comprising:
  encrypting data, by the first computing device, using bits in a first portion of the sequence as an encryption key, to produce encrypted data;
  XORing, by the first computing device, the encrypted data based on bits in a second portion of the sequence to produce encrypted and XORed data;
  sending the encrypted and XORed data to the second computing device; and
  using the sequence of bits, by the second computing device, to un-XOR and decrypt the encrypted and XORed data.

9. The method of claim 1, comprising validating at least one of: the first computing device and entity, by the second device, based on matching the received data with data in the sequence of bits.

10. The method of claim 8, comprising, prior to the encrypting and XORing, including error detection information in the data.

11. The method of claim 8, wherein the first computing device is adapted to:
  prior to encrypting the data, prompting a user to provide a confirmation; and
  if confirmation is received from the user then performing the encryption, wherein the encryption serves as a proof of signature.

12. The method of claim 8, further comprising, prior to the encrypting, XORing the data using bits in a third portion of the sequence.

13. The method of claim 12, wherein the first, second, and third portions are obtained from predefined offsets in the sequence.

14. The method of claim 13, wherein the offsets are advanced periodically or based on an event.

15. The method of claim 13, wherein the offsets are synchronously and automatically advanced by the first computing device and the second computing device.

16. A computer-implemented method of validating a device or an identity of an entity, the method comprising:
  including in first computing device and second computing device an identical sequence of bits, wherein the identical sequence of bits is included on a hardware storage system that:
    enables an operation selected from the group consisting of XORing data, encrypting data, and decrypting data, based on portions of the sequence, and
    enables preventing reading data from the storage system or writing data to the storage system;
  encrypting a predefined clear text, by the first computing device, using data in a first offset in the identical sequence of bits as an encryption key, to generate encrypted data;
  XORing, by the first computing device, the encrypted data using bits in a second offset in the identical sequence of bits to produce encrypted data and XORed data;
  sending the encrypted data and XORed data to the second computing device;
  using the identical sequence of bits, by the second computing device, to un-XOR and decrypt the encrypted data and XORed data to produce clear text; and
  if the produced clear text matches the predefined clear text,
    then determining, by the second computing device, that at least one of the first computing device and an entity associated with the first computing device is validated.

17. A system comprising:
a first computing device comprising a first memory and first controller;
a second computing device comprising a second memory and second controller:
providing an identical sequence of bits to the first computing device and to the second computing device, wherein the identical sequence of bits is provided on a hardware storage system that:
  enables an operation selected from the group consisting of: XORing data, encrypting data, and decrypting data, based on portions of the sequence, and enables preventing reading data from the storage system or writing data to the storage system;

wherein the first computing device is configured to:
encrypt predefined data, using bits in a first portion of the bit sequence as an encryption key, to produce encrypted data, XOR the encrypted data based on bits in a second portion of the bit sequence to produce encrypted data and XORed data, and send the encrypted data and XORed data to the second computing device;

wherein the second computing device is configured to:
use the sequence of bits to unXOR and decrypt the encrypted data and XORed data, and wherein the first computing device is configured to:
receive data from the second computing device, and
determine that at least one of the second computing device and an entity associated with the second computing device is authenticated based on at least one of:
matching the received data with data in the identical sequence of bits,
matching the received data with data sent to the second computing device, and
matching the received data with the predefined data.

18. The method of claim 17, wherein the first portion and the second portion are located using offsets which are synchronously and automatically advanced by the first controller and the second controller.

\* \* \* \* \*